US012184896B2

(12) United States Patent
Salahieh et al.

(10) Patent No.: US 12,184,896 B2
(45) Date of Patent: *Dec. 31, 2024

(54) TECHNIQUES FOR ENCODING AND DECODING IMMERSIVE VIDEO

(71) Applicant: Intel Corporation, Santa Clara, CA (US)

(72) Inventors: Basel Salahieh, Santa Clara, CA (US); Jill M. Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,768

(22) Filed: Jun. 30, 2022

(65) Prior Publication Data
US 2022/0337873 A1 Oct. 20, 2022

Related U.S. Application Data

(63) Continuation of application No. 16/918,667, filed on Jul. 1, 2020, now Pat. No. 11,432,009.
(Continued)

(51) Int. Cl.
*H04N 19/597* (2014.01)
*H04N 13/111* (2018.01)
*H04N 13/178* (2018.01)

(52) U.S. Cl.
CPC ......... *H04N 19/597* (2014.11); *H04N 13/111* (2018.05); *H04N 13/178* (2018.05)

(58) Field of Classification Search
CPC .. H04N 19/597; H04N 13/178; H04N 13/111; H04N 13/139; H04N 13/161; H04N 13/172; H04N 13/156
See application file for complete search history.

(56) References Cited

U.S. PATENT DOCUMENTS 5,532,833 A * 7/1996 Hong ................ G11B 27/11
348/E7.071
9,544,598 B2 * 1/2017 Hao ................ H04N 19/132
(Continued)

FOREIGN PATENT DOCUMENTS

WO 2010033151 3/2010
WO WO-2010033151 A1 * 3/2010 ........... H04N 19/587
(Continued)

OTHER PUBLICATIONS

United States Patent and Trademark Office "Non-Final Office Action" mailed in connection with U.S. Appl. No. 16/918,667, on Oct. 26, 2021, 22 pages.
(Continued)

*Primary Examiner* — Rowina J Cattungal
(74) *Attorney, Agent, or Firm* — Hanley, Flight & Zimmerman, LLC

(57) ABSTRACT

An example apparatus for encoding immersive video includes a view optimizer to receive a plurality of input views from a source camera and select basic views and additional views from the plurality of input views. The apparatus also includes a view pruner to prune the additional views based on a comparison with the basic views. The apparatus further includes a patch packer to generate atlases based on the pruned additional views and the basic views. The apparatus includes a metadata composer to generate metadata including additional metadata. The apparatus also further includes a bitstream generator to generate a bitstream including the encoded video and the metadata.

16 Claims, 17 Drawing Sheets

Related U.S. Application Data

(60) Provisional application No. 62/869,902, filed on Jul. 2, 2019.

(56) References Cited

U.S. PATENT DOCUMENTS

| | | | | |
|---|---|---|---|---|
| 9,813,707 | B2* | 11/2017 | Zhang | H04N 19/139 |
| 2011/0170615 | A1* | 7/2011 | Vo | H04N 19/85 |
| | | | | 375/E7.076 |
| 2012/0288015 | A1* | 11/2012 | Zhang | H04N 19/152 |
| | | | | 375/240.26 |
| 2013/0163661 | A1* | 6/2013 | Zhang | H04N 19/132 |
| | | | | 375/240.02 |
| 2013/0170558 | A1* | 7/2013 | Zhang | H04N 19/46 |
| | | | | 375/240.24 |
| 2014/0168362 | A1* | 6/2014 | Hannuksela | H04N 13/161 |
| | | | | 348/43 |
| 2015/0095360 | A1* | 4/2015 | Vrcelj | G06F 18/24143 |
| | | | | 707/758 |
| 2017/0316609 | A1* | 11/2017 | Dunn | G06T 19/006 |
| 2018/0234673 | A1* | 8/2018 | Zabatani | H04N 13/25 |
| 2018/0286013 | A1* | 10/2018 | Noh | G06T 3/0093 |
| 2019/0320164 | A1* | 10/2019 | Salahieh | H04N 13/156 |
| 2019/0371051 | A1* | 12/2019 | Dore | G06T 17/00 |
| 2020/0020133 | A1* | 1/2020 | Najaf-Zadeh | G06T 3/40 |
| 2020/0107028 | A1* | 4/2020 | Vosoughi | H04N 19/20 |
| 2020/0228777 | A1* | 7/2020 | Dore | G06T 9/001 |
| 2020/0314435 | A1* | 10/2020 | Tourapis | G06T 7/74 |
| 2020/0374559 | A1* | 11/2020 | Fleureau | H04N 5/23238 |
| 2021/0112236 | A1* | 4/2021 | Fleureau | H04N 21/85406 |
| 2021/0176496 | A1* | 6/2021 | Chupeau | G06T 7/529 |

FOREIGN PATENT DOCUMENTS

| | | | | |
|---|---|---|---|---|
| WO | 2018130491 | | 7/2018 | |
| WO | WO-2018130491 | A1 * | 7/2018 | G06T 17/00 |
| WO | 2019191205 | | 10/2019 | |
| WO | WO-2019191205 | A1 * | 10/2019 | H04N 13/117 |

OTHER PUBLICATIONS

United States Patent and Trademark Office "Notice of Allowance" mailed in connection with U.S. Appl. No. 16/918,667, on May 2, 2022, 7 pages.

* cited by examiner

700A

700B

700C

700D

TECHNIQUES FOR ENCODING AND DECODING IMMERSIVE VIDEO

RELATED APPLICATIONS

This patent arises from a continuation of U.S. patent application Ser. No. 16/918,667, titled "TECHNIQUES FOR ENCODING AND DECODING IMMERSIVE VIDEO," now U.S. Pat. No. 11,432,009, and filed on Jul. 1, 2020, which claims the benefit of U.S. Provisional Patent Application No. 62/869,902, filed on Jul. 2, 2019. Priority to U.S. patent application Ser. No. 16/918,667, and U.S. Provisional Patent Application No. 62/869,902 is claimed. U.S. patent application Ser. No. 16/918,667, and U.S. Provisional Patent Application No. 62/869,902 are hereby incorporated herein by reference in their entireties.

BACKGROUND

Immersive videos are video recordings where a view in every direction is recorded at the same time. For example, immersive videos may be captured using an omnidirectional camera or a collection of cameras. During playback on normal flat display, a viewer has control of the viewing direction like a panorama.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
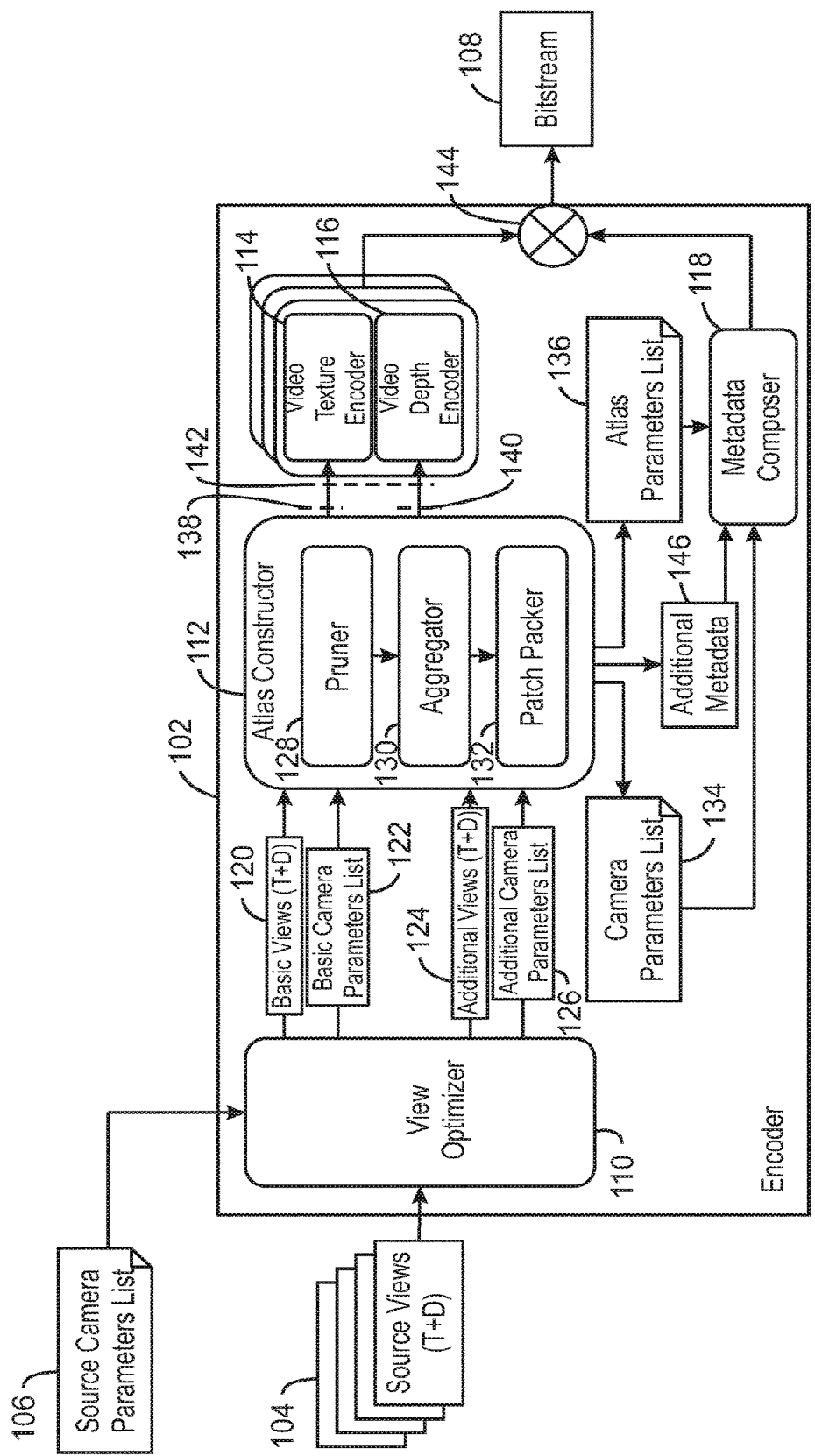
FIG. 1 is a block diagram illustrating an example system for encoding a bitstream according to techniques described herein.

Immersive video codecs enable multiple views of video to be captured and encoded and rendered via a decoder into a particular viewport. A viewport, as used herein, is a projection of texture onto a planar surface of a field of view of an omnidirectional or 3D image or video suitable for display and viewing by the user with a particular viewing position and orientation. For example, the viewport may be displayed via a head mounted display (HMD) worn by a user to provide different viewing positions and orientations to change the particular view. Immersive video codecs may use angular redundancy across various views in addition to the spatio-temporal redundancy in the video streams themselves when encoding and decoding immersive video. However, immersive encoding methods may not be able to effectively handle patches belonging to foreground objects or occluded and edge regions. In this respect, patches refer to rectangular regions extracted from views of captured immersive video during encoding or compression.

The present disclosure relates generally to techniques for encoding and decoding immersive video. Specifically, the techniques described herein include an apparatus, method and system for encoding and decoding immersive video. An example apparatus includes a view optimizer to receive a plurality of input views from a source camera and select basic views and additional views from the plurality of input views. The apparatus includes a view pruner to prune the additional views based on a comparison with the basic views. The apparatus further includes a patch packer to generate atlases based on the pruned additional views and the basic views. The apparatus also includes a metadata composer to generate metadata including additional metadata. For example, the additional metadata may include number of groups used to prune the additional views, a list of views that correspond to each of the groups, a visibility list, or view percentage metadata. The apparatus further includes a bitstream generator to generate a bitstream including the encoded video and the metadata.

The techniques described herein enable groups of views to be used to prune additional views. This grouping may enable both parallelized pruning and rendering of views. With this grouping in place, a decoder can access certain parts of a bitstream to extract the related group's coded atlases and execute rendering. Also, in some examples, parallel processing can be implemented on various groups to enable simultaneous multiple output rendered views. Such parallel processing may also enable real-time immersive applications. The techniques described herein also enable patches belonging to foreground objects or occluded and edge regions to be handled such that the immersive renderer at the decoder side can provide better rendering results. For example, the view pruner can prune additional views using weight maps with an adjustable threshold enabling tuning of quality and bitrate. Moreover, the techniques may provide patch-based multi-pass rendering that enables maintenance of coherency in cases where multiple patches are mapped to the same location in the rendered viewport. Patch-based multi-pass rendering may help improve image quality by reducing artifacts. In addition, in some examples, the techniques described herein may allow each atlas may to be tagged with what percentage of the samples of a particular view is included in the atlas. This information may be sent in a bitstream as per atlas metadata. Such mechanism using the views' percentage info per atlas can enable real-time performance which is critical for immersive applications.

FIG. 1 is a block diagram illustrating an example system for encoding a bitstream according to techniques described herein. The example system 100 can be implemented in the computing device 1300 below in FIG. 13 using the methods 800-1100 of FIGS. 8-11.

The example system 100 includes an encoder 102 shown receiving source views 104 and a source camera parameters list 106 and generating a bitstream 108. A source view may be any source video material before encoding that corresponds to the format of a view representation, which may have been acquired by capture of a 3D scene by a real camera or by projection by a virtual camera onto a surface using source camera parameters. For example, source views 104 may include two components including a texture component and a depth component. The source camera parameters list 106 can include parameters such as view position, orientation, resolution, among other possible parameters. The encoder 102 includes a view optimizer 110, an atlas constructor 112, a video texture encoder 114, a video depth encoder 116, and a metadata computer 118. The view optimizer 110 is shown sending a set of basic views 120, a basic camera parameters list 122, a set of additional views 124, and an additional camera parameters list 126 to the atlas constructor 112. The basic camera parameters list 122 may be a list of one or more camera parameters that define the projection used to generate a basic view representation from a 3D scene, including intrinsic and extrinsic parameters. The additional camera parameters list 126 may be a list of one or more camera parameters that define the projection used to generate an additional view representation from a 3D scene.

The atlas constructor 112 includes a pruner 128, an aggregator 130, and a patch packer 132. The atlas constructor 112 is shown generating a camera parameters list 134 and an atlas parameters list 136 to the metadata computer 118. The atlas constructor 112 is shown sending a texture component 138 to the video texture encoder 114 and a depth component 140 to the video depth encoder 116, as indicated by dotted lines intersecting the corresponding arrows. The texture component 138 and the depth component 140 may be together referred to as an atlas 142, as indicated by a dotted line that intersects the arrows representing the sending of both texture component 138 and the depth component 140. For example, the atlas 142 may be an aggregation of patches from one or more view representations after a packing process, into a picture group which contains a texture component picture, a corresponding depth component picture, and a corresponding occupancy map picture. In the context of an atlas, a patch refers to a rectangular region within an atlas 142 that corresponds to a rectangular region within a view representation. The system 100 also includes a data combiner 144 to combine the encoded video depth and texture data from the video texture encoder 114 and the video depth encoder 116 and the metadata from the metadata composer 118 into a bitstream 108. In various examples, the atlas constructor 112 also outputs additional metadata 146. For example, the additional metadata 146 may include grouping parameters, weights per patch, a per patch visibility list, or per atlas view percentage for each view.

As shown in FIG. 1, a set of views 104 may be received. For example, the views 104 may include a texture component and a depth component. The texture component may be a texture video. In some examples, the texture video may be received via imaging devices such as video cameras. The texture videos may be RGB image data each having R (red), G (green), and B (blue), values for pixels thereof or image data in any suitable image space, such as YUV. As one example, texture video pictures or frames may have any suitable resolution, such as a resolution of 1920×1080 pixels. In various examples, any other resolution may be used. In some examples, video cameras may be arranged alongside or above and below one another to form a camera array or a grid. In various examples, such camera arrays or grids may include any number of cameras with such cameras spaced out in a horizontal direction to provide a horizontal camera array, a vertical direction to provide a vertical camera array. In some examples, the cameras may be arranged in both directions to provide a camera grid to generate any number of video images. In various examples, the depth component of source views 104 may be in the form of depth maps. For example, depth maps may be attained or generated using any suitable technique, such as block matching between adjacent video images, optical flow techniques, among other suitable techniques.

The view optimizer 110 selects basic views 120 and additional views 124 from the source view 104 and sends both to the atlas constructor 112 along with a basic camera parameters list 122 and an additional camera parameters list 126. For example, the view optimizer 110 may determine a number of basic views 120 to be used based on direction deviation, field of view, and distance and overlap between views. For example, a pair of views with a greatest direction deviation is determined. If two pairs have equal direction deviation, then the pair with the largest sum of field of views may be used. Based on the amount of overlap between the selected pair of views, the view optimizer 110 may determine whether one or more basic views are to be selected. If a threshold overlap is exceeded, then the view optimizer 110 may determine that only one basic view is to be selected. If a threshold overlap is not exceeded, then the view optimizer 110 may determine that multiple basic views are to be selected. The view optimizer may then select the basic views 120 based on the distance to a central view position and some overlap. If only one basic view is needed, then the view optimizer 110 may select the view of the pair of views with the larger field of view. If multiple basic views are to be selected, then the view optimizer 110 may select the pair of views as basic views and determine another view with the largest direction deviation with the pair of views. If the third view has less than 50% FOV overlap with the already selected basic views, then view is selected as a basic view, and the same process is repeated to find the next basic view. Otherwise the process stops. All other non-selected source views may be labeled as additional views 124 and passed along with the basic views 120 to the output of the view optimizer. The additional views 124 may be pruned prior to being sent to the aggregator 130. As used herein, pruning refers to filtering of information from views, such that patches of the views are sent to the aggregator 130 instead of entire additional views 124. As used herein, patches are rectangular regions of views. For example, a patch may be part of a view, or a whole view. In various examples, redundant patches of the additional views 124 may be filtered out and patches with relevant information may be saved and passed to the aggregator 130. For example, the patches may be from one or more additional views. In various examples, the basic views 120 may be passed without any modifications to the aggregator 130 of the atlas constructor 112.

The aggregator 130 may aggregate patches from the pruner over time and send the aggregated patches to the patch packer 132. For example, an aggregated mask is reset at the beginning of each intra period. Then, an accumulation is done for each mask's pixel i with the 1 value across the different frames of the intra period by implementing the logical operation OR as follows:
aggregatedMask[i]@current_frame=max(Mask[i]@current_frame, aggregated Mask[i]@previous_frame). The process is completed at the end of the intra period by outputting the last accumulation result. The patch packer 132 may receive collections of patches, identify clusters in the patches, and sequentially pack each cluster into the atlases. An atlas, as used herein, is a collection of patches. Atlases may thus also have a texture components and a depth component. The atlas constructor 112 can select the number of atlases based on parameters including an atlas resolution parameter that describes an atlas width and an atlas height, and a maximum size parameter that indicates a maximum size of all atlases combined expressed in luma samples (Mpixels) for the texture frame.

The atlas constructor 112 can concatenate the basic parameters list 122 with the additional camera parameters list 126 and output a camera parameters list 134. The atlas constructor 112 can also output an atlas parameters list 136. For example, the atlas parameters list 136 may include location data of patches within a scene, among other atlas related metadata, such as syntax to indicate the size, position, and rotation of each patch.

The metadata composer 118 can merge the camera parameters list 134 and the atlas parameters list 136 and generate metadata to be sent to the data combiner 144. In some examples, the metadata composer 118 also receives additional metadata 146 and includes this additional metadata 146 in the metadata, as discussed herein.

The video texture encoder 114 and the video depth encoder 116 may encode received atlases 142 using any suitable codec. For example, the codec used may be the High Efficiency Video Coding (HEVC) codec, first released 2013, or any other suitable codec.

In some examples, the pruner 128 may prune additional views grouped in association with one or more basic views based on redundancy. For example, each of the groups may be processed in parallel, as described in system 300 of FIG. 3 and method 800 of FIG. 8. In some examples, the number of groups and which views represented in camera parameters list being part of which encoded group, or equivalently the atlases related to each group, are included in the camera parameters list (or as group index per atlas parameters in the additional metadata 146 and included within the metadata by the metadata composer 118.

In various examples, the pruner 128 may prune additional views using a weight map associated with each additional view. For example, the weight maps may provide weights for each patch that may be compared with a threshold. In some examples, the threshold may be adjustable. For example, the pruner 128 may prune the additional views as described with respect to the system 500 or the method 900. The weights per patch may be included in the additional metadata 146 and may be included by the metadata composer 118 in the metadata included in the bitstream 108.

In some examples, the pruner 128 may tag unpruned additional views with a visibility list. For example, the visibility list may be included in the additional metadata 146. In some examples, the pruner 128 may prune redundant patches in additional views in an order based on distance from basic views, as described in system and method 1000 of FIG. 10.

In various examples, the atlas constructor 112 may generate per atlas visibility metadata that indicates a percentage of each view included in each atlas. For example, the atlas constructor 112 may generate the per atlas visibility metadata as described in method 1100 of FIG. 11.

The diagram of FIG. 1 is not intended to indicate that the example system 100 is to include all of the components shown in FIG. 1. Rather, the example system 100 can be implemented using fewer or additional components not illustrated in FIG. 1 (e.g., additional views, metadata, bitstreams, components, etc.).

Figure 2:
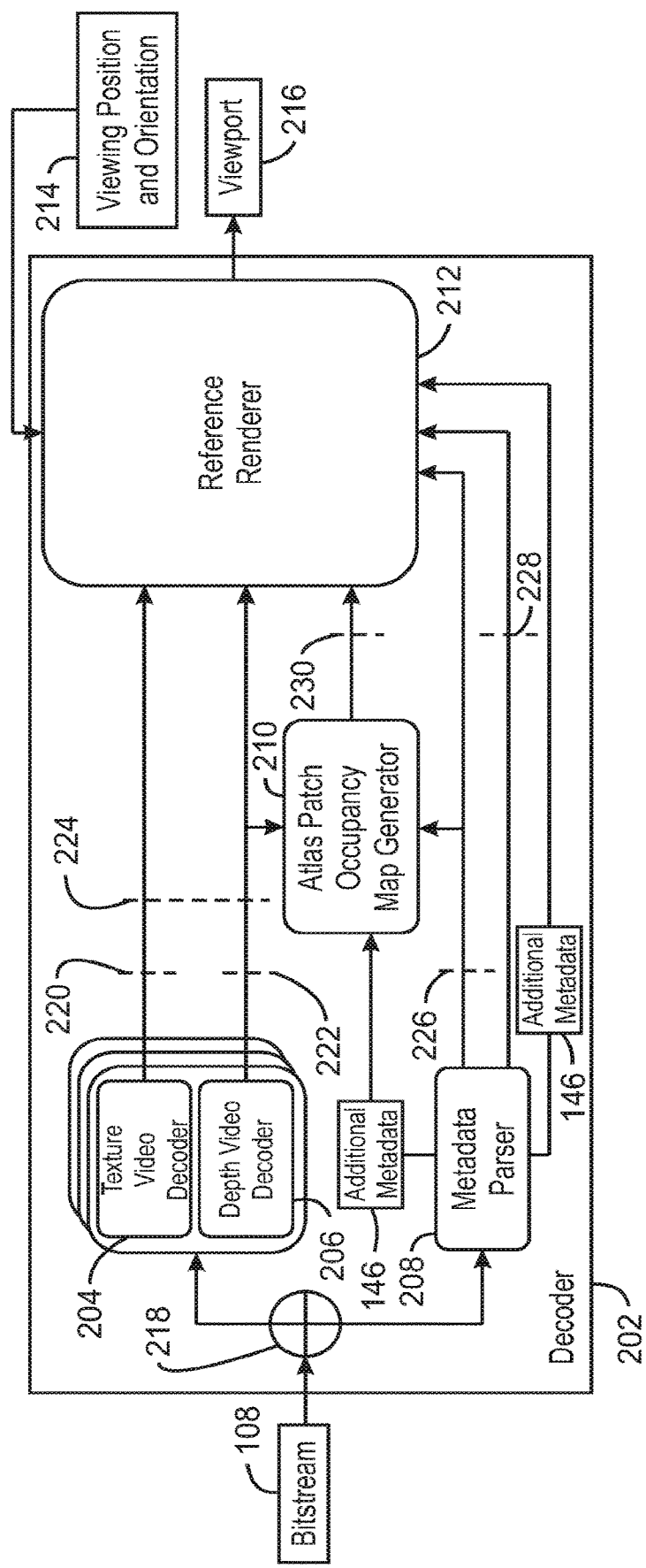
FIG. 2 is a block diagram illustrating an example system for decoding a bitstream encoded according to techniques described herein.

FIG. 2 is a block diagram illustrating an example system for decoding a bitstream encoded according to techniques described herein. The example system 200 can be implemented in the computing device 1300 below in FIG. 13 using the method 1200 of FIG. 12 below. For example, the system 200 may be implemented in the decoder 1342 of FIG. 13.

The example system 200 includes similarly numbered elements from FIG. 1. The system 200 also includes a decoder 202 shown receiving a bitstream 108. For example, the bitstream 108 may be received from an encoder, such as the encoder 102 of system 100. The system 200 further includes a texture video decoder 204 and a depth video decoder 206. The system 200 also includes an atlas patch occupancy map generator 210. The system 200 also includes a reference renderer, shown receiving a viewing position and orientation 214 and generating a viewport 216. The system 200 also further includes a splitter 218 to split the bitstream 108 into an encoded video and metadata. The system 200 also includes a texture component 220 and a depth component 222 together forming an atlas 224, as indicated by perpendicular dashed lines. The system 200 also includes an atlas parameters list 226 and a camera parameters list 228, and an atlas patch occupancy map 230, as indicated by perpendicular dashed lines. The atlas patch occupancy map 230 may be a 2D array corresponding to an atlas whose values indicate for each sample position in the atlas which patch the sample corresponds to, or if the sample is invalid.

As shown in FIG. 2, the decoder 202 can receive a bitstream 108 and output a particular viewport 216 based on the received viewing position and orientation 214. For example, the bitstream 108 may be split into an encoded video and metadata via the splitter 218.

The encoded video may be decoded by the texture video decoder 204 and the depth video decoder 206 to generate an atlas 224. The atlas 224 includes a texture component 220 and a depth component 222. As one examples, a continuous video stream (CVS) for each texture and depth layer of a layer pair is input to an HEVC decoder, which outputs a sequence of decoded picture pairs of synchronized decoded texture pictures corresponding to texture component 220 and decoded depth pictures corresponding to depth component 222. Each decoded picture pair may represent an atlas 224. The atlas 224 may be sent to the reference renderer 212.

The metadata from the splitter 218 may be received by the metadata parser 208. The metadata parser 208 can parse the metadata and generate an atlas parameters list 226, a camera parameters list 228, and additional metadata 136. In various examples, the additional data 136 may be sent to the atlas patch occupancy map generator 210, the reference renderer, or both.

The atlas patch occupancy map generator 210 may receive a depth decoded picture corresponding to depth component 222 and the atlas parameters list 226 and generate an atlas patch occupancy map 230. In various examples, the atlas patch occupancy map 230 may be an index of the patches in the atlas 224 within a scene. An occupancy map may thus be generated for each atlas and may have the same size as the atlas. In some examples, the map may be created by browsing the atlas parameters list from the parsed metadata exactly in the same order as during its creation, to resolve any overlapping. In various examples, the atlas patch occupancy map 230 may be used in a loop on the atlas's samples to get their respective PatchId, which enables getting the respective CameraId, hence enabling the de-projection and re-projection on the viewport 216.

In various examples, the reference renderer 212 may receive the atlas 224, the atlas patch occupancy map 230 and the camera parameters list, and generate a viewport 216 based on a received viewing position and orientation 214 of a display. For example, the viewport 216 may be displayed in a head mounted display.

The diagram of FIG. 2 is not intended to indicate that the example system 200 is to include all of the components shown in FIG. 2. Rather, the example system 200 can be implemented using fewer or additional components not illustrated in FIG. 2 (e.g., additional metadata, bitstreams, renderers, views, etc.). For example, the output of the reference renderer 212 may be a single view with 10-bit texture and 10-bit depth components. In some examples, the single view may be omnidirectional.

Figure 3:
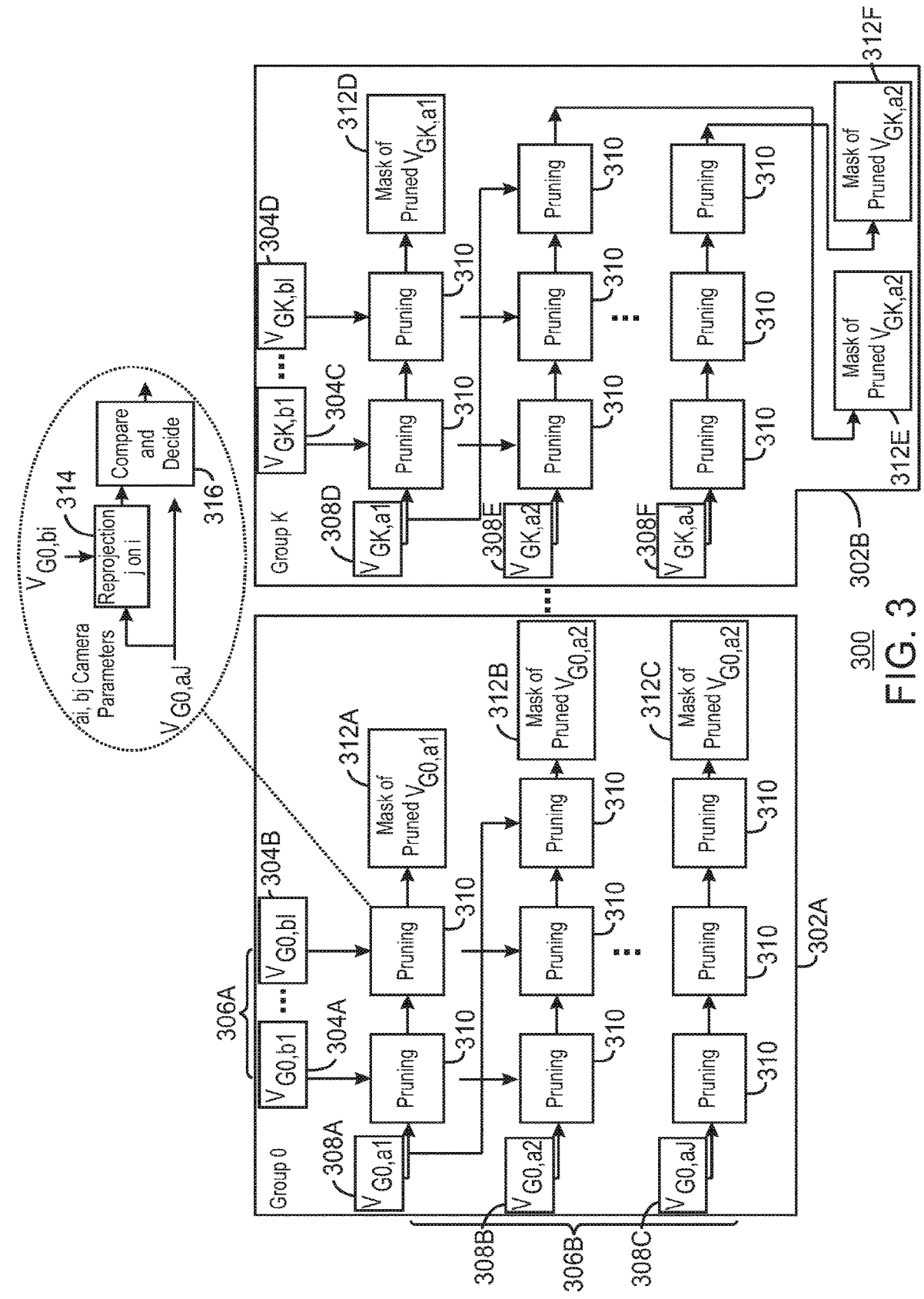
FIG. 3 is a block diagram illustrating an example system for pruning views using groups.

FIG. 3 is a block diagram illustrating an example system for pruning views using groups. The example system 300 can be implemented in the computing device 1300 in FIG. 13 using the method 800 of FIG. 8.

The example system 300 includes a two groups 302A and 302B of views. For example, each of the groups 302A and 302B may include a number of neighboring views. As indicated by an ellipses, in various examples, three or more groups of views may be present in system 300. Group 302A includes basic views 304A and 304B having a depth of 306A, indicating the number of basic views. For example, the depth 306A may depend on the overlap among input views. As indicated by ellipses, the depth 306A may be greater than two. In some examples, the depth 306A may be one. The group 302A further includes additional views 308A, 308B, and 308C, with a depth 306B. As also indicated by ellipses, the depth 306B may be more than three. The group 302A further includes a number of pruning blocks 310 that may be performed to generate masks 312A, 312B, and 312C.

The group 302B includes basic views 304C and 304D and additional views 308D, 308E, and 308F. The group 302B also has a number of pruning blocks 310 and resulting masks 312D, 312E, 312F. In some examples, the depth 306A and depth 306B of group 302B may be the same as group 302A. In various examples, the number of groups chosen for encoding is a preset parameter and is set based on the amount of motion and the geometry of the capturing system covering the content.

As shown in FIG. 3, a set of basic views and additional view may have been selected by a view optimizer, as described in FIG. 1. For example, the basic views 304A-304D and additional views 308A-308F may have been chosen by the view optimizer 110 of FIG. 1. For each of the selected additional views 308A-308F, a set of pruning blocks 310 may be applied to remove redundant information and keep relevant information. For example, the relevant information may be patches of texture or depth information that is not included in any of the basic views or prior additional views. As shown in a detail, the pruning blocks 310 may each include a reprojection 314 of a particular additional view on a particular basic view based on camera parameters associated with the particular additional view and the particular basic view. The pruning blocks 310 also each include a compare and decide block 316. For example, the additional view 308A may be compared with the basic view 304A and redundant portions removed with relevant portions passed to a second pruning block 310. The second pruning block 310 may compare the received patches corresponding to relevant portions and compare them with the basic view 304B. The resulting mask 312A may include all patches that correspond to relevant portions of additional view 308A over basic views 304A and 304B.

In various examples, the additional view 308B may be similarly processed. However, additional view 308B may also be compared to additional view 308A. The resulting mask 312B may indicate all patches of additional view 308B that are not present in basic views 304A and 304B, as well as additional view 308A.

Although not shown using arrows for simplicity, additional view 308C may similarly be pruned to exclude redundant information based on basic views 304A and 304B, as well as additional views 308A and 308B and any other intervening additional views in examples using four or more additional views. Thus, additional view 308A may also be used to prune additional views 308B and 308C, and additional views 308A and 308B may be used to prune additional view 308C.

Thus, rather than encoding all input views at once, the views are divided into multiple groups each contains a subset of neighboring views. Each group 302A and 302B is then encoded separately. Thus, in some examples, the encoding of all groups 302A and 302B can happen simultaneously in parallel as there is no dependency between groups 302A and 302B, reducing significant processing time.

In addition, encoding by group may ensure having multiple corresponding projections from the foreground objects or occluded or edge regions in the atlases of these groups rather than having one across all atlases when no grouping is done. In other words, there may be at least one local patch of corresponding projection per group. Performing a per-group rendering using local patches may produce significant quality improvement especially for natural content cases because the patches are associated with coherent depth maps. For example, the depth maps may be coherent because they are estimated locally between neighboring views. Although each group may use at least one basic view and therefore may increase number of encoded atlases and making multiple corresponding projections of the foreground or occlusion patches across all groups may increase used bandwidth slightly, the significant gain achieved in quality may outweigh these costs.

The diagram of FIG. 3 is not intended to indicate that the example system 300 is to include all of the components shown in FIG. 3. Rather, the example system 300 can be implemented using fewer or additional components not illustrated in FIG. 3 (e.g., additional basic views, additional views, masks, etc.).

Figure 4:
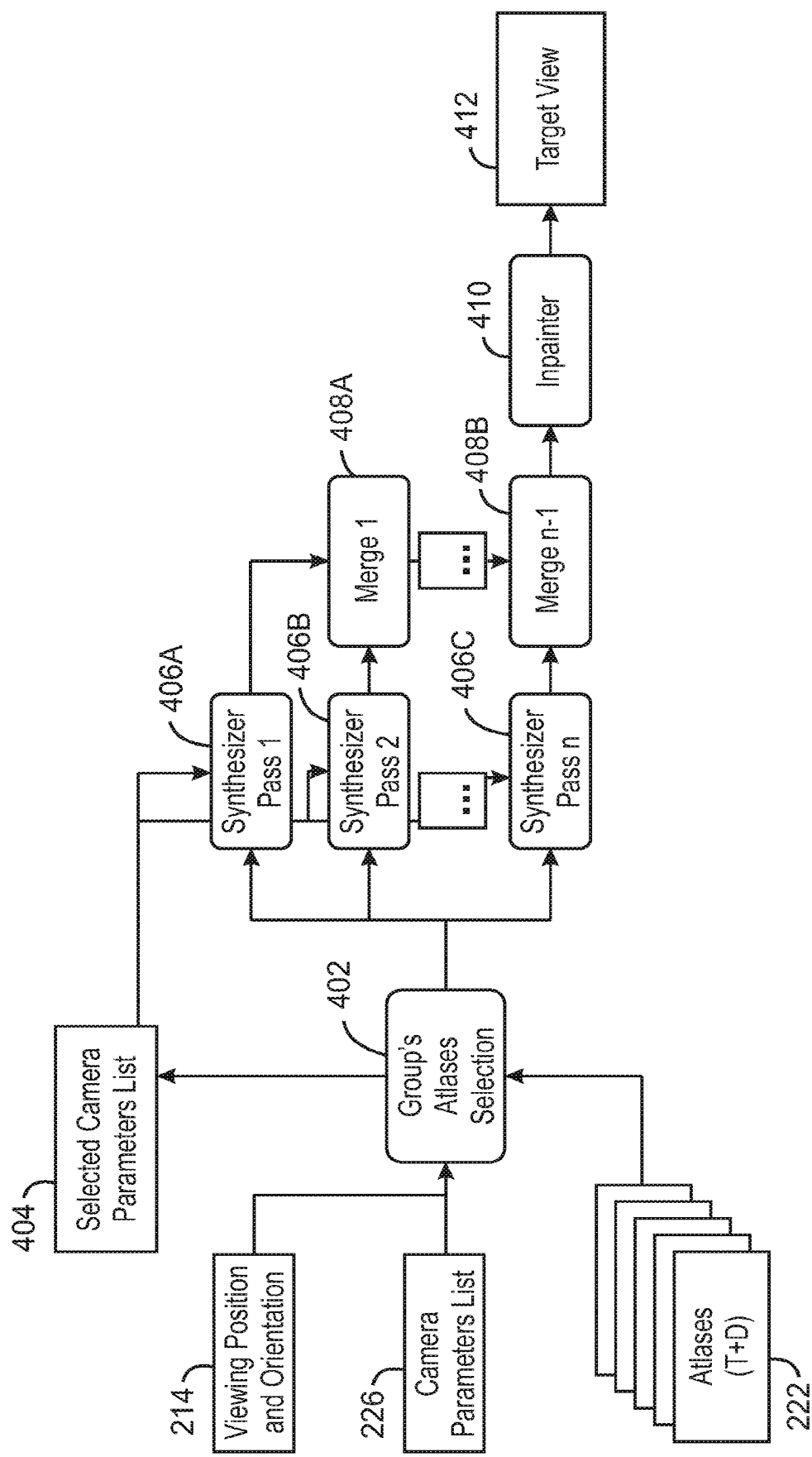
FIG. 4 is a block diagram illustrating an example system for group-based multi-pass rendering.

FIG. 4 is a block diagram illustrating an example system for group-based multi-pass rendering. The example system 400 can be implemented in the decoder and renderer 1344 of the computing device 1300 below in FIG. 13 using the method 11 of FIG. 11.

The example system 400 includes similarly numbered elements from FIG. 2. In addition, the system 400 includes a group's atlases selection 402. The group's atlases selection 402 is shown sending a selected camera parameters list 404 to a set of synthesizer passes 406A, 406B, and 406C. The system 400 further includes a number of merges 408A and 408B. The merge 408B is communicatively coupled to an inpainter 410. The inpainter 410 is shown generating a target view 412. In various examples, a target view may be either perspective viewport or omnidirectional view at the desired viewing position and orientation. An omnidirectional view is a view representation that enables rendering according to the user's viewing orientation, if consumed with a head-mounted device, or according to user's desired viewport, otherwise, as if the user was in the spot where and when the view was captured.

As shown in FIG. 4, a set of atlases 222 are received as input. In addition, a camera parameters list 226 and a viewing position and orientation 214 are received as input. For example, the camera parameters list 226 may be received from parsed metadata as described in FIG. 2. In various examples, the number of groups and which views being part of which encoded group may have been included in the camera parameters list during encoding. In some examples, the number of groups and which views being part of which encoded group may be indicated as group index per atlas parameters. The viewing position and orientation 214 may be received from a display device to indicate a desired synthesized view, also referred to herein as a target view 412. The number of groups included in the metadata is used to set the number of synthesizer passes 406A-406C.

In various examples, the group's atlases selection 402 uses the received position and orientation 214 to compute a distance between a target view 412 and the closest view from each group. In some examples, the group's atlases selection 402 may then sort the groups by proximity to the target view 412 to be synthesized. For example, the groups are sorted from the closest to the farthest with respect to the pose of the desired synthesized target view 412. The sorted groups may be passed to the synthesizer passes 406A-406C.

The synthesizer pass 406A may receive the group of atlases from the sorted group that is the closest to the target view 412 to be synthesized. The selection of which atlases to be used for synthesizing an intermediate view in a particular pass will depend on their group index parameters included in the metadata, the group distance to the desired pose to be synthesized as requested by a head-mounted display, and the pass index. In various examples, synthesis may include generic reprojection of image points, rasterizing triangles, and blending views or pixels. Generic reprojection may include unprojection of image to scene coordinates using intrinsic source camera parameters, changing the frame of reference from the source to the target camera by a combined rotation and translation using extrinsic camera parameters, and projecting the scene coordinates to image coordinates using target camera intrinsic parameters. Rasterizing triangles may include discarding inverted triangles, creating a clipped bounding box, and Barycentric interpolation of color and depth values. At synthesizer pass 406A, because the synthesis is performed only using neighboring views of the group, the results of synthesis provided to merge 408A may be less complete, but more coherent. As used herein, coherency refers to the consistency of depth maps or color of different patches that contribute to the same region in the desired synthesized view. The result of the synthesizer pass 406A may be a first intermediate synthesized view. In various examples, the first intermediate synthesized view may have some missing information, such as holes, occluded regions, or bounding regions, due to missing patches. For example, the pruner may throw away non-redundant patches when it cannot fit them in the atlases due to a bandwidth upper-limit set by an "MPixel" atlas parameter per group, thus resulting in such missing info within the group's atlases. As one example, the first intermedia view may have outer portions of a full field of view of the target view missing, but may not contain many, if any, artifacts.

In the second synthesizer pass 406B, in the consecutive passes more atlases from neighboring groups are used for the synthesis. For example, groups of atlases from the next two closest set of groups from the sorted groups may be used to synthesize a second intermediate synthesized view. The second intermediate synthesized view may have more artifacts.

At the synthesizer pass 406C a number n of groups are synthesized, including all groups of the sorted list. The intermediate results of the final synthesizer pass 406C may be more complete, but also contain more artifacts due to depth maps between the different views being used having less coherency. For example, the final pass may use all atlases across all groups in the rendering, resulting in a more complete intermediate synthesized view since non-redundant patches thrown away in one group may exist in other groups, but with artifacts. For example, the artifacts may be due to incoherency of depth maps.

At merges 408A-408B, the synthesis results of individual synthesis passes 406A-406C are merged together in a successive manner to output a coherent and complete synthesis result. In some examples, the inpainter 410 can fill any missing regions prior to outputting the requested target view 412. For example, the inpainter 410 can fill in missing regions using extrapolation or interpolation techniques, or any other suitable techniques.

In various examples, upper limits may be set as to the number of patches allowed in any single group. Thus, using a multi-pass rendering may enable patches that are not available in some groups, but available in other groups, to be included in the synthesis of the target view 412. Moreover, the user of a multi-pass rendering highly improves the quality and eliminates many artifacts. In various examples, such artifacts may be due to depth incoherency, sharp depth transition between neighboring pixels, color inconsistency across views, among other causes.

With this grouping in place, a decoder can access certain parts of a bitstream to extract the related group's coded atlases and execute rendering. Also, in some examples, parallel processing can be implemented on various groups to enable simultaneous multiple output rendered views. Such parallel processing may enable real-time immersive applications.

The diagram of FIG. 4 is not intended to indicate that the example system 400 is to include all of the components shown in FIG. 4. Rather, the example system 400 can be implemented using fewer or additional components not illustrated in FIG. 4 (e.g., additional atlases, synthesizer passes, merges, target views, etc.).

Figure 5:
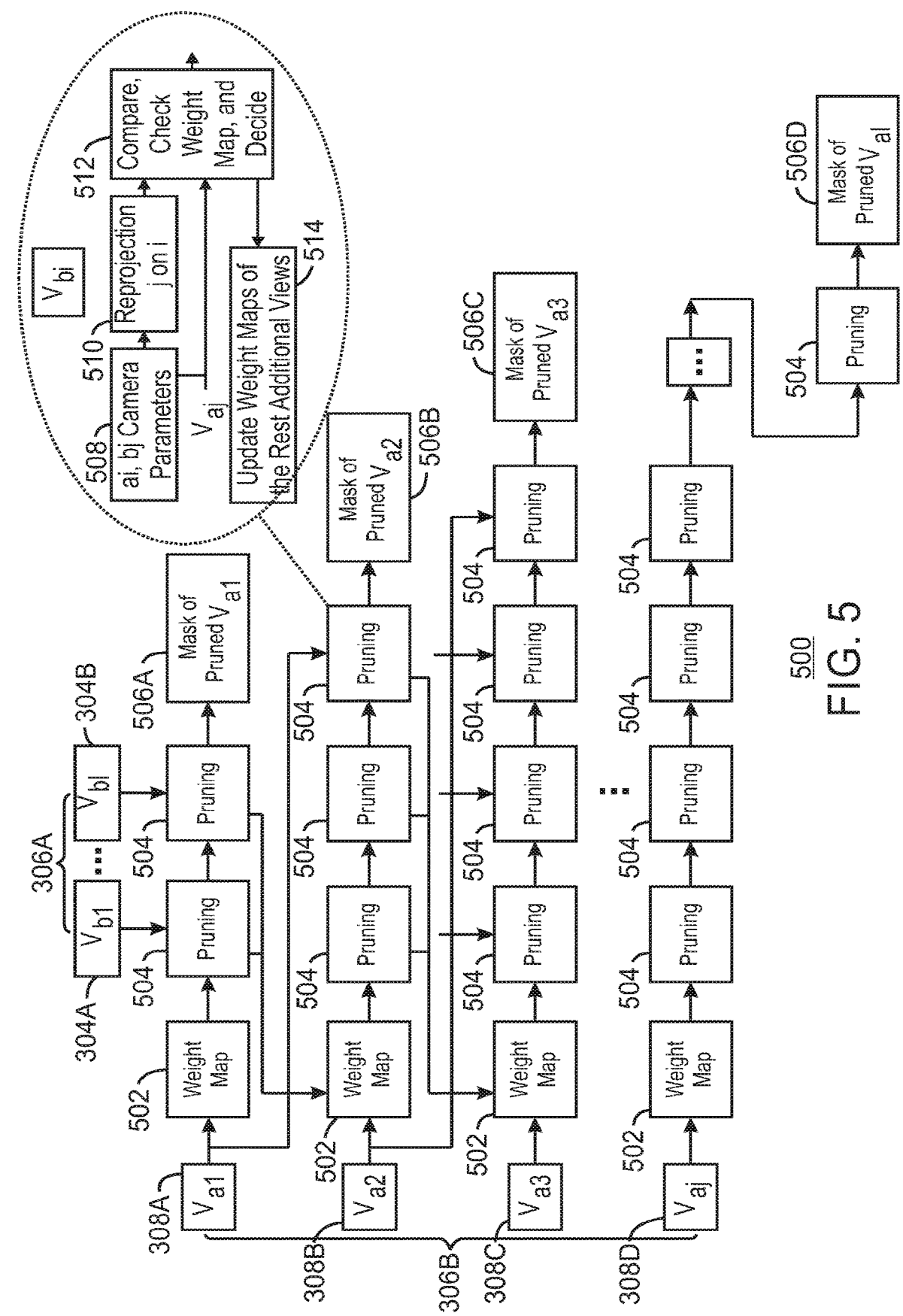
FIG. 5 is a block diagram illustrating an example system for weight optimized pruning of additional views.

FIG. 5 is a block diagram illustrating an example system for weight optimized pruning of additional views. The example system 500 can be implemented in the computing device 1300 in FIG. 13 using the method 800 of FIG. 8.

The example system 500 includes similarly numbered elements from FIG. 3. In addition, the system 500 includes a set of weight maps 502 that are used to perform a weighted optimized pruning at pruning blocks 504 to result in a set of masks 506A-506D having more redundancy. For example, each of the additional views 308A-308D may have its own corresponding weight map 502. Each of the pruning blocks 504 includes receiving camera parameters 508 associated with the corresponding basic view and additional view being compared. Each of the pruning blocks 504 also includes a reprojection of the additional view onto the basic view, similar to FIG. 3. However, each of the pruning blocks 504 also includes a compare, check weight map, and decision block 512. In addition, each of the pruning blocks 504 also includes an update 514 of weight maps of the rest of additional views.

As shown in FIG. 5, all views are encoded at once in a single group, as opposed to using multiple groups in FIG. 3. However, higher weights are assigned for edge or occlusion regions and for the foreground objects. For example, the higher weights may be in form of a weight map that has the same resolution of the related view. In various examples, the edge or occlusion regions can be inferred by running gradient operator on texture images. The foreground objects can be inferred based on the content of the depth maps.

In various examples, a view optimizer selects the basic and the additional views then the pruning 504 operates on the additional views to extract non-redundant patches, as shown in block 508-512 and described in FIG. 3. However, for each pruning block 504, at block 512, a pruner may also check the weights of each region before each region is thrown away. For example, if the region has a higher weight, then the region may be carried as a patch in the atlases despite being redundant. At block 514, the region's weight may then be decreased in the rest of additional views if the region is visible in them. For example, being visible in this context may mean that there exists a correspondent region in the other view that can be formed by reprojecting the patch from its original view into the other view. In various examples, the pruning process may continue and weights iteratively reduced until a threshold is exceeded. For example, the threshold may be indicated as a preset parameter. In response to detecting the threshold is exceeded, the pruner may then consider the region to be redundant and prune the region away for the rest of the views. For example, the threshold being exceeded may indicate that enough corresponding projections of that region may have been generated in the outputted atlases.

In some examples, a multi-pass renderer may then be implemented to use the corresponding projections that are closest to the desired viewport to produce coherent intermediate synthesized view for these regions in first pass, while using all patches or atlases in the final pass to produce an intermediate synthesized view with complete information, as described in FIG. 4. The intermediate synthesized views are finally merged into a single coherent and complete synthesized viewport.

In various examples, an amount of redundant representation of the corresponding regions can be controlled through adjustment of the weights or threshold. This adjustment may enable tuning of quality and bitrate. As one example, the quality and bitrate can be varied dynamically depending on the motion in the scene and the location of the capturing system.

The diagram of FIG. 5 is not intended to indicate that the example system 500 is to include all of the components shown in FIG. 5. Rather, the example system 500 can be implemented using fewer or additional components not illustrated in FIG. 5 (e.g., additional basic views, additional views, masks, weight maps, etc.).

Figure 6:
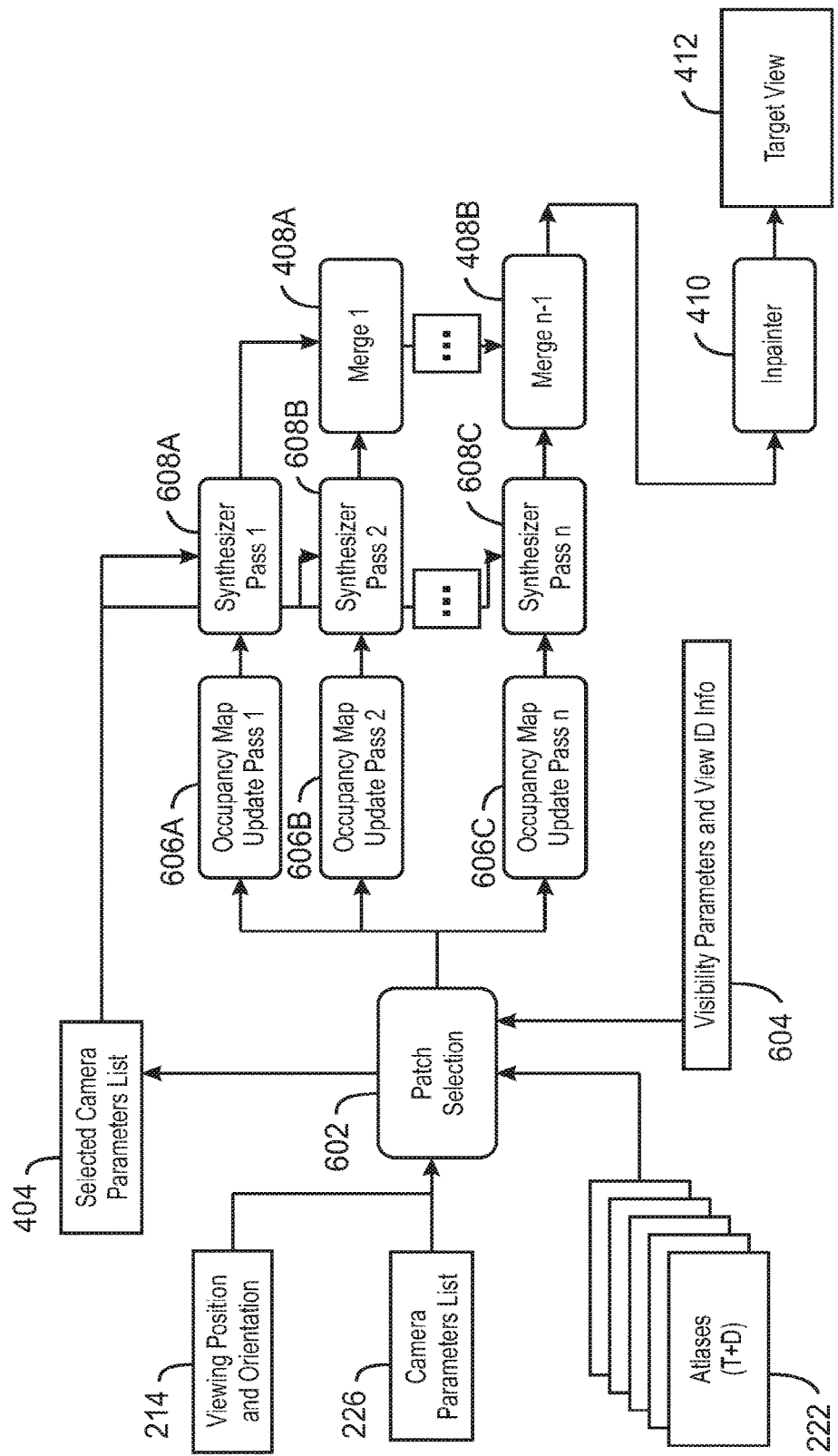
FIG. 6 is a block diagram illustrating an example system for patch-based multi-pass rendering.

FIG. 6 is a block diagram illustrating an example system for patch-based multi-pass rendering. The example system 600 can be implemented in the decoder 1344 computing device 1300 below in FIG. 13 using the method 11 of FIG. 11.

The example system 600 includes similarly numbered elements from FIGS. 2 and 4. The system 600 further includes a patch selection 602. The patch selection 602 is shown receiving a set of visibility parameters and view ID information 604. The patch selection 602 is communicatively coupled to a set of occupancy map update passes 606A-606C. The occupancy map update passes 606A-606C are coupled to a set of corresponding synthesizer passes 608A-608C. The synthesizer passes 608A-608C are coupled to a set of merges 408A and 408B. The final merge 408B is coupled to an inpainter, which is shown generating a target view 412.

In various examples, each patch resulting from a pruning as described herein may be tagged with a visibility list indicating a set of views in which each patch is visible. For example, the visibility list can be used to indicate if correspondent regions are available in other views. In various examples, the visibility list may be represented as bitmask covering all views or as coded bits per view. In some examples, patches from background objects may be visible in neighboring views, while patches from foreground objects may be visible across wider views as reflected by their disparity information. In various examples, the visibility list may be added per patch within the atlas patch parameters list that is included in the metadata. In the example of FIG. 6, this visibility list may have been extracted from the metadata and is shown as the visibility parameters and view ID information 604.

As shown in FIG. 6, a patch-based multi-pass renderer can check the visibility lists of all patches included in the metadata for the decoded atlases and select patches that are visible at the closest views to the viewport being rendered. Then, a multi-pass rendering is applied to the selected patches.

In various examples, the visible patches are sorted based on their corresponding view's distance to the desired rendering pose. For example, the patches may be sorted using a view Id parameter 604 that may have been included in the atlas patch parameter list in the metadata of a bitstream. In some examples, visible patches belonging to the closest views are used for the synthesis in the first synthesizer pass 608A. Then, more patches may be used in the following synthesizer passes 608B and 608C. Finally, all intermediate synthesized views generated by the synthesizer passes 608A-608C are merged together in merges 408A and 408B to form a single coherent and complete synthesized viewport. As in FIG. 4, in some examples, an inpainter 410 can fill any missing regions prior to outputting the requested target view 412. For example, the inpainter 410 can fill in missing regions using extrapolation or interpolation techniques, or any other suitable techniques.

Applying patch-based multi-pass rendering helps maintain coherency in cases where multiple patches are mapped to the same location in the rendered viewport. Thus, patch-based multi-pass rendering may help improve image quality by reducing artifacts.

In various examples, the additional views may be ordered differently such that the farthest view with respect to the basic views is pruned first. Then, the second farthest additional view to the basic views and the previously pruned additional view may be pruned next. In some examples, this process may be repeated until all additional views outputted by the view optimizer are sorted. Ordering the additional views in this way may maximize the size of extracted patches and reduce their overall number. In turn, this may also enhance the continuity within atlases and make their video encoding more efficient. For example, the same quality video may be generated using a reduced bitrate.

The diagram of FIG. 6 is not intended to indicate that the example system 600 is to include all of the components shown in FIG. 6. Rather, the example system 600 can be implemented using fewer or additional components not illustrated in FIG. 6 (e.g., additional atlases, occupancy maps, synthesizer passes, merges, target views, etc.).

Figure 7A:
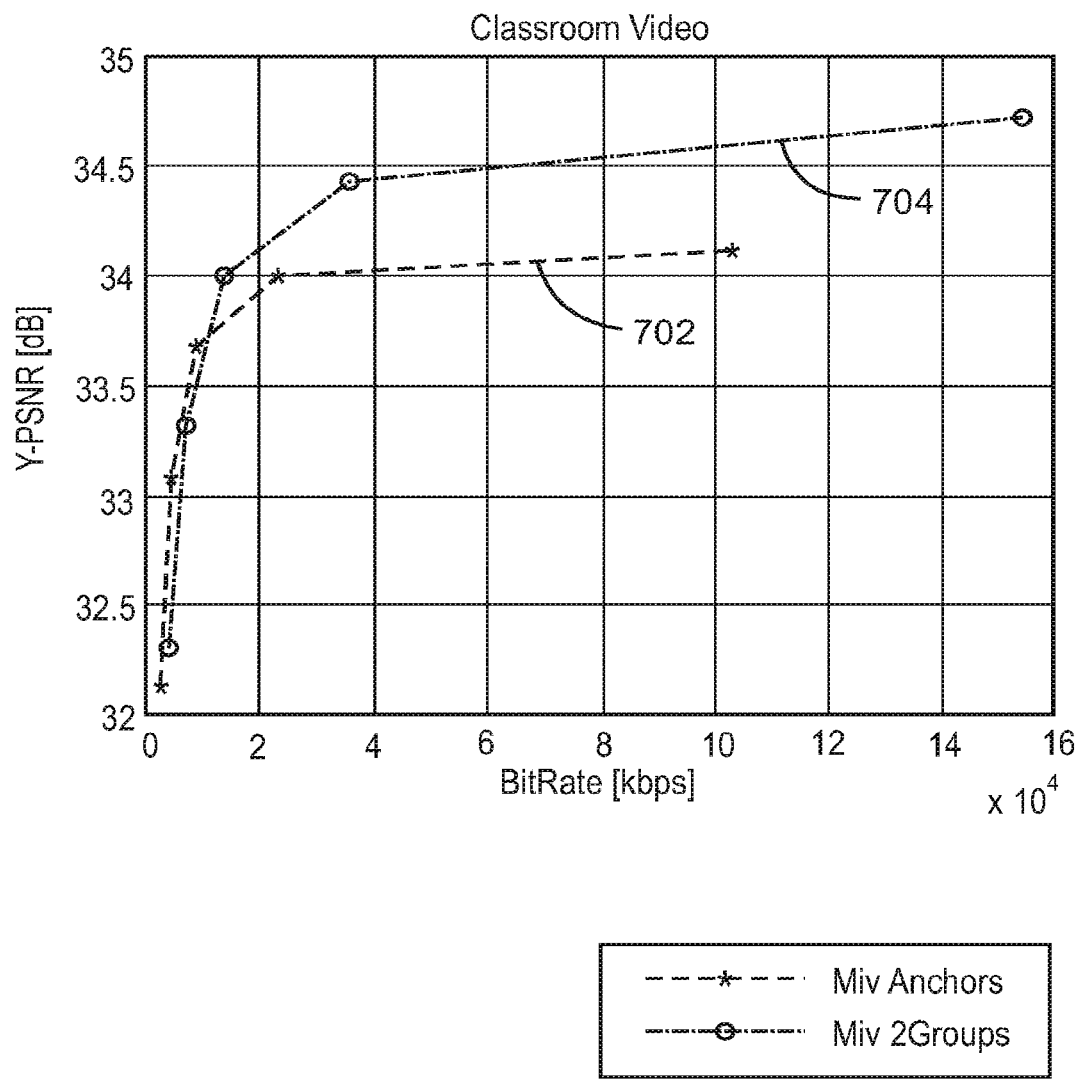
FIG. 7A is a graph illustrating an example set of rate-distortion curves for a synthetic dataset encoded using group-based multi-pass rendering.

FIG. 7A is a graph illustrating an example set of rate-distortion curves for a synthetic dataset encoded using group-based multi-pass rendering. The example graph 700A was generated based on a group-based rendering system, such as the system 400 of FIG. 4. The vertical axis indicates quality of rendered images while the horizontal axis indicates the amount of bandwidth used.

FIG. 7A shows a set of curves including a rate-distortion curve without group-based multi-pass rendering 702 and a rate-distortion curve with group-based multi-pass rendering 704. The synthetic dataset of FIG. 7A includes a simulated classroom video.

As shown in graph 700A, the group-based multi-pass rendering 704 rate-distortion curve is slightly outperformed at lower bit rates, however exceeds the quality of the rendering 702 without group-based multi-pass rendering from about one kilobit per second onwards. Thus, group-based multi-pass rendering shows significant improvements in rate-distortion tradeoffs. Such gain becomes even more significant at higher bitrates.

Figure 7B:
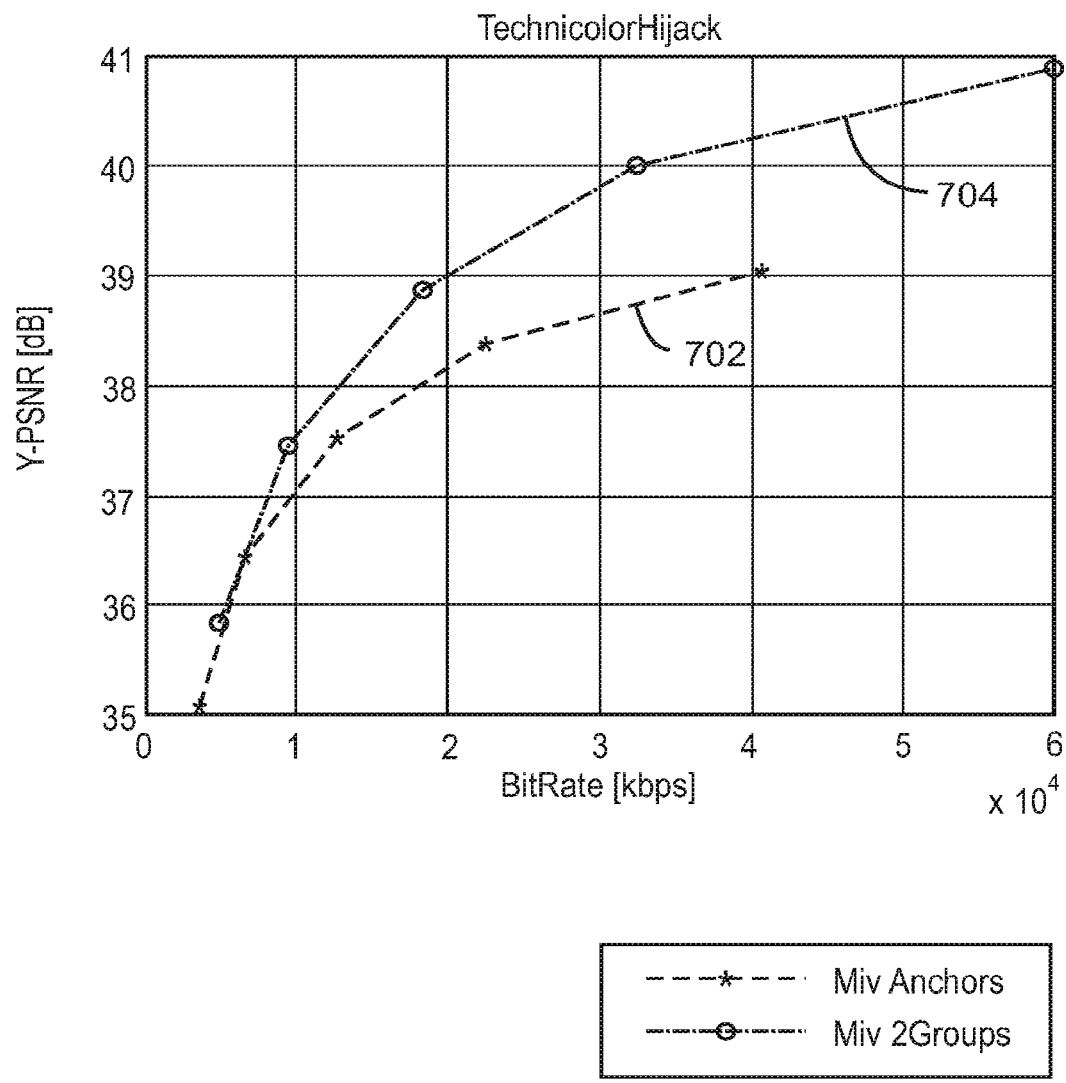
FIG. 7B is a graph illustrating an example set of rate-distortion curves for a second synthetic dataset encoded using group-based multi-pass rendering.

FIG. 7B is a graph illustrating an example set of rate-distortion curves for a second synthetic dataset encoded using group-based multi-pass rendering. The example graph 700B was generated based on a group-based rendering system, such as the system 400 of FIG. 4. The vertical axis indicates quality of rendered images while the horizontal axis indicates the amount of bandwidth used.

FIG. 7B also shows a set of curves including a rate-distortion curve without group-based multi-pass rendering 702 and a rate-distortion curve with group-based multi-pass rendering 704. The synthetic dataset of FIG. 7B includes a simulated technicolor environment.

As shown in graph 700B, the group-based multi-pass rendering 704 rate-distortion curve exceeds the quality of the rendering 702 without group-based multi-pass rendering at every bit rate and continues to increase in benefit with higher bitrates. Thus, group-based multi-pass rendering clearly shows significant improvements in rate-distortion tradeoffs.

Figure 7C:
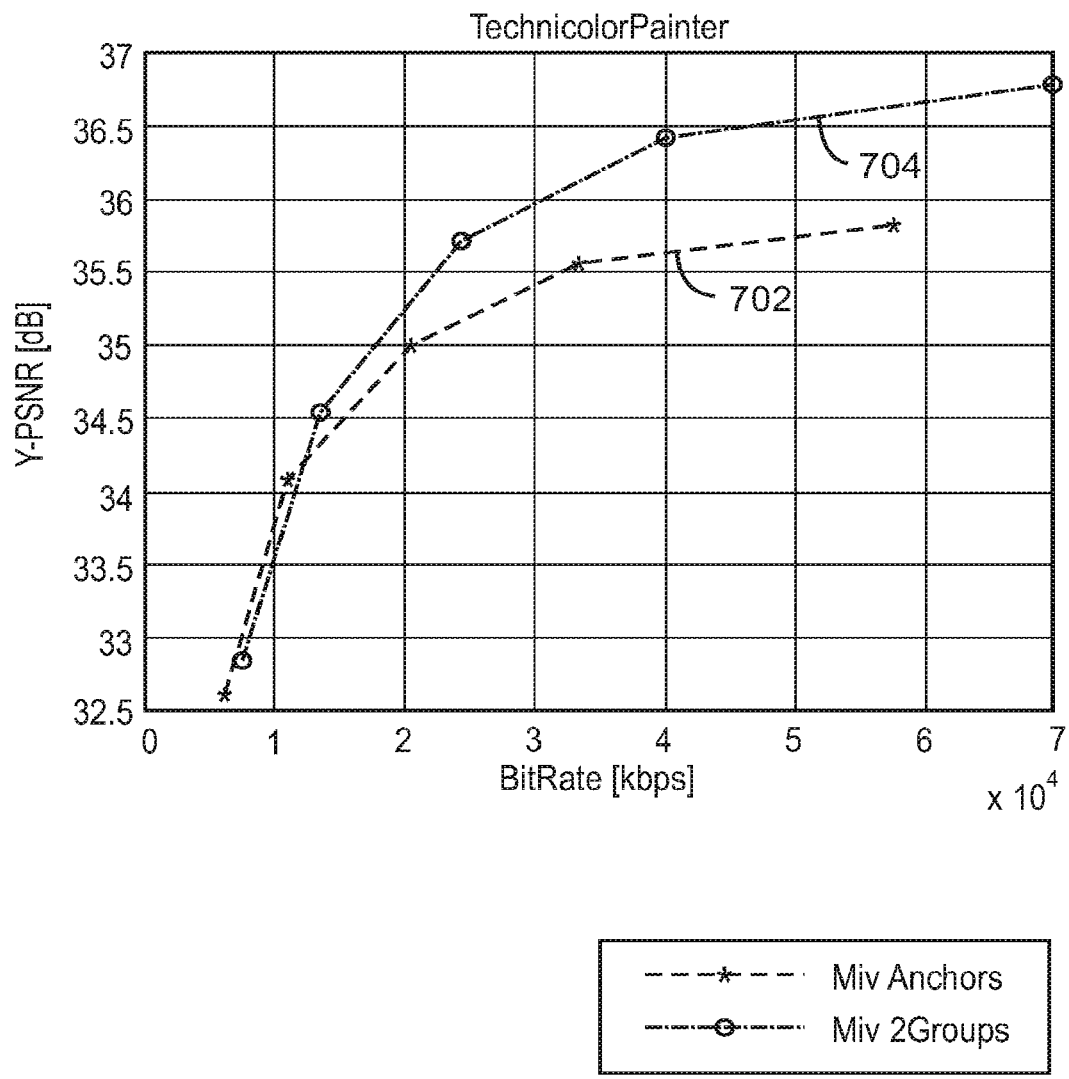
FIG. 7C is a graph illustrating an example set of rate-distortion curves for a natural content dataset encoded using group-based multi-pass rendering.

FIG. 7C is a graph illustrating an example set of rate-distortion curves for a natural content dataset encoded using group-based multi-pass rendering. The example graph 700C was generated based on a group-based rendering system, such as the system 400 of FIG. 4. The vertical axis indicates quality of rendered images while the horizontal axis indicates the amount of bandwidth used.

FIG. 7C shows a set of curves including a rate-distortion curve without group-based multi-pass rendering 702 and a rate-distortion curve with group-based multi-pass rendering 704. The natural content dataset of FIG. 7C includes a simulated technicolor painter environment.

As shown in graph 700C, the group-based multi-pass rendering 704 rate-distortion curve exceeds the quality of the rendering 702 without group-based multi-pass rendering at almost every bit rate and continues to increase in benefit with higher bitrates. Thus, group-based multi-pass rendering clearly shows significant improvements in rate-distortion tradeoffs.

Figure 7D:
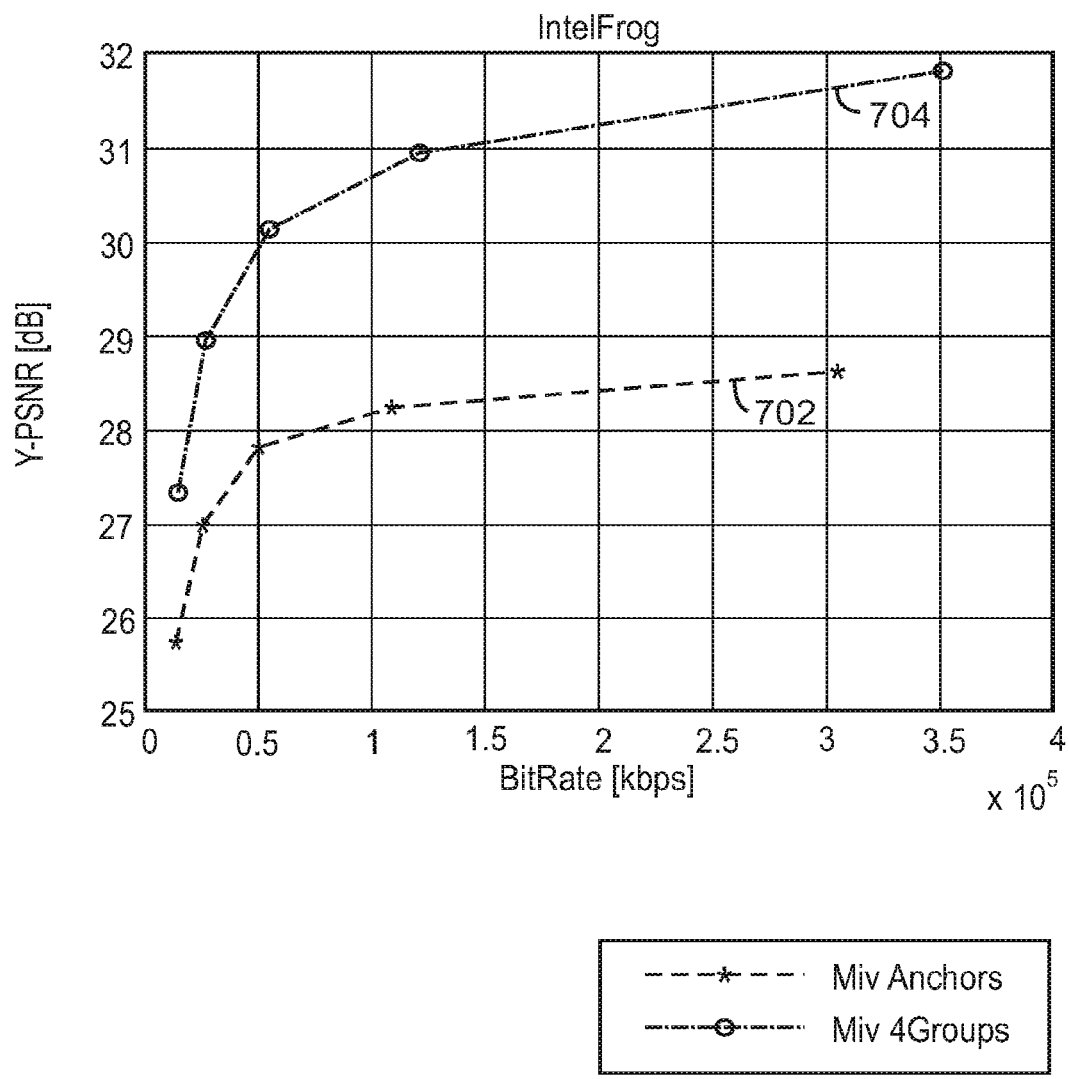
FIG. 7D is a graph illustrating an example set of rate-distortion curves for a second natural content dataset encoded using group-based multi-pass rendering.

FIG. 7D is a graph illustrating an example set of rate-distortion curves for a second natural content dataset encoded using group-based multi-pass rendering. The example graph 700D was generated based on a group-based rendering system, such as the system 400 of FIG. 4. The vertical axis indicates quality of rendered images while the horizontal axis indicates the amount of bandwidth used.

FIG. 7D shows a set of curves including a rate-distortion curve without group-based multi-pass rendering 702 and a rate-distortion curve with group-based multi-pass rendering 704. The natural content dataset of FIG. 7D includes objects that are closer and in motion, resulting in a much more challenging scene for rendering.

As shown in graph 700D, the group-based multi-pass rendering 704 rate-distortion curve exceeds the quality of the rendering 702 without group-based multi-pass rendering at almost every bit rate and continues to increase in benefit with higher bitrates. Thus, using group-based multi-pass rendering again clearly shows significant improvements in rate-distortion tradeoffs.

Figure 8:
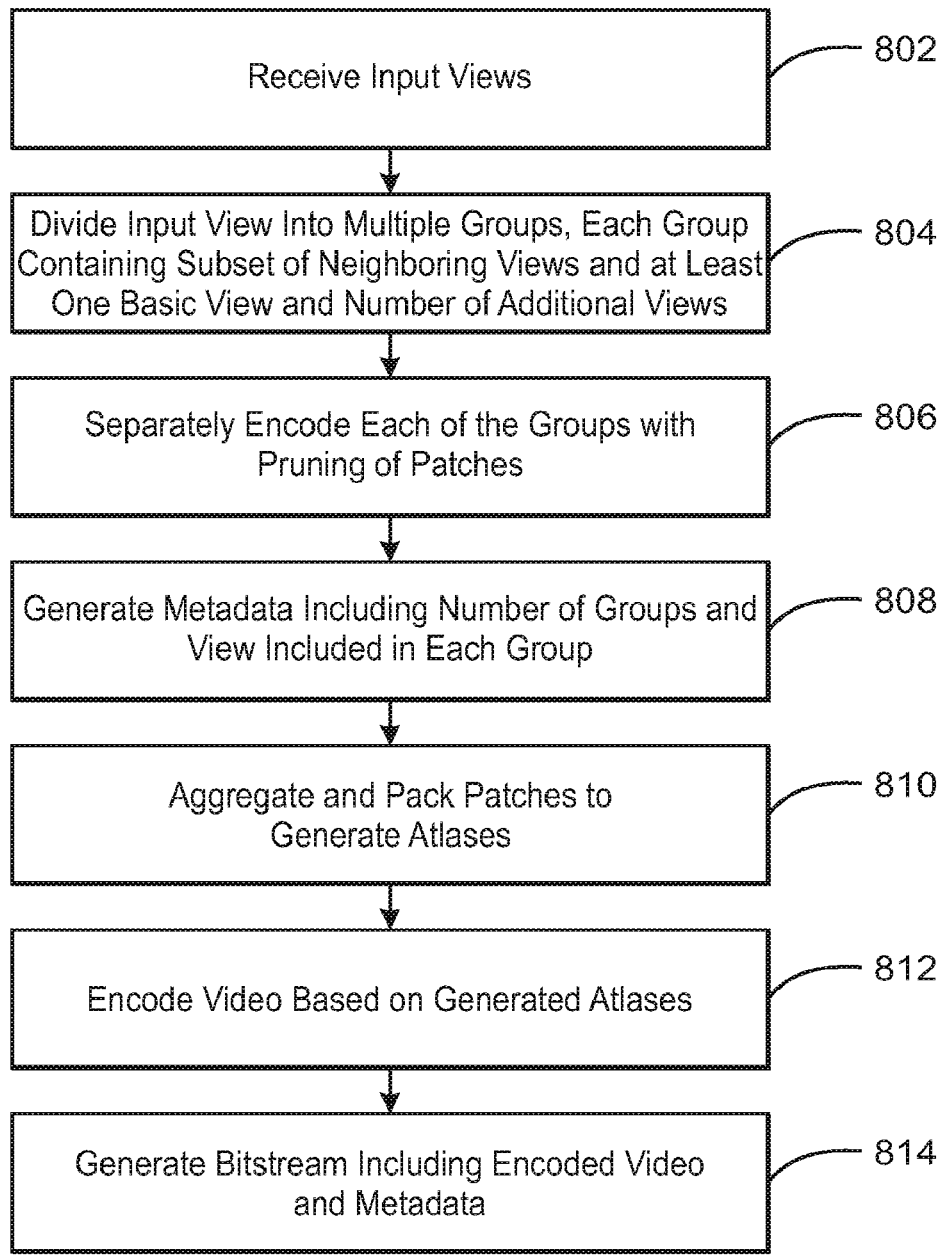
FIG. 8 is a flow chart illustrating a method for generating bitstreams using group-based pruning.

FIG. 8 is a flow chart illustrating a method for generating bitstreams using group-based pruning. The example method 800 can be implemented in the system 100 of FIG. 1, the processor 1302 and immersive video encoder 1328 of the computing device 1300 of FIG. 13, or the computer readable media 1400 of FIG. 14.

At block 802, input views are received. For example, the input views may be a set of source views from a source camera.

At block 804, the input views are divided into multiple groups. Each of the groups contains a subset of neighboring views and at least one basic view and number of additional views.

At block 806, each of the groups are separately encoded with pruning of patches. For example, the pruning may be performed according to the system 300 of FIG. 3.

At block 808, metadata including number of groups and view included in each group is generated. For example, the metadata may be sent to a metadata composer to be included in metadata for a bitstream.

At block 810, patches are aggregated and packed to generate atlases. For example, each of the atlases may include a number of patches.

At block 812, video is encoded based on generated atlases. For example, the video may be encoded using any suitable codec, such as the HEVC codec.

At block 814, a bitstream including encoded video and metadata is generated. For example, the generated bitstream can be transmitted to a decoder tor generating views at a viewport based on a viewing position and orientation.

This process flow diagram is not intended to indicate that the blocks of the example method 800 are to be executed in any particular order, or that all of the blocks are to be included in every case. Further, any number of additional blocks not shown may be included within the example method 800, depending on the details of the specific implementation.

Figure 9:
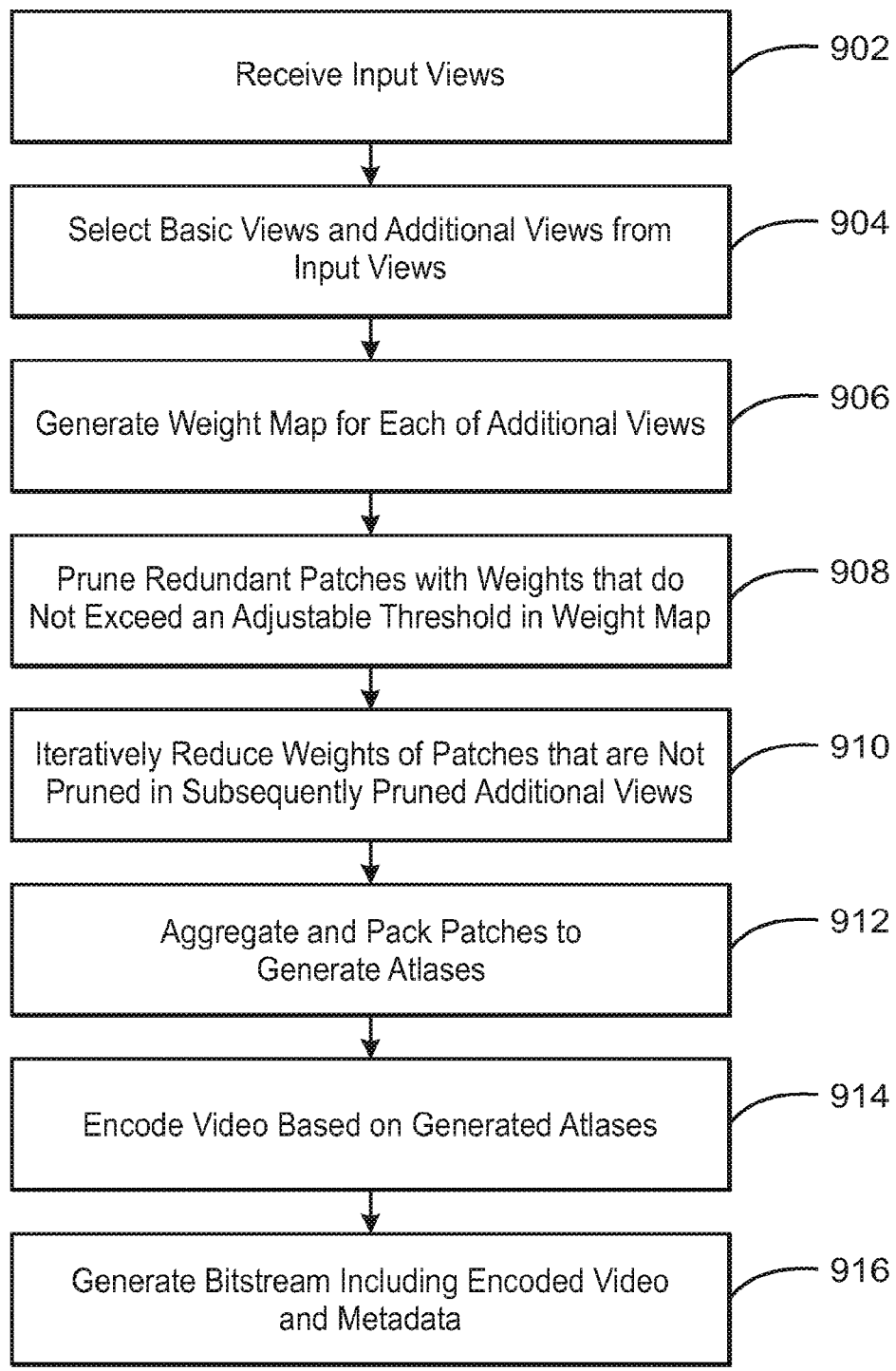
FIG. 9 is a flow chart illustrating a method for generating bitstreams using weighted pruning.

FIG. 9 is a flow chart illustrating a method for generating bitstreams using weighted pruning. The example method 900 can be implemented in the system 100 of FIG. 1, the processor 1302 and immersive video encoder 1328 of the computing device 1300 of FIG. 13, or the computer readable media 1400 of FIG. 14. For example, the method 900 may be implemented using the system 500 of FIG. 5.

At block 902, input views are received. For example, the input views may be a set of source views from a source camera.

At block 904, basic views and additional views are selected from the input views. For example, a number of basic views 120 to be used may be determined based on direction deviation, field of view, and distance and overlap between views. Basic views may be selected based on the distance to a central view position and some overlap. In various examples, all other non-selected source views may be labeled as additional views and passed along with the basic views to the output of the view optimizer.

At block 906, a weight map is generated. In various examples, the weight map has higher weights for edge or occlusion regions and foreground objects.

At block 908, redundant patches with weights that do not exceed an adjustable threshold in a weight map are pruned. For example, patches that may otherwise be considered redundant may nonetheless be included in a mask if their associated weight in a weight map exceeds the threshold. In some examples, the threshold may be a preset threshold. In various examples, the threshold may be a dynamic threshold that is based on detected motion in a scene or the location of the capturing system that captured the input views.

At block 910, weights of patches that are not pruned are iteratively reduced in subsequently pruned additional views For example, each time a patch that is otherwise redundant is included in a mask, the weight associated with the patch may be adjusted in the weight maps of remaining additional views.

At block 912, the patches are aggregated and packed to generate atlases. For example, each of the atlases may include a number of patches.

At block 914, a video is encoded based on the generated atlases. For example, the video may be encoded using any suitable codec, such as the HEVC codec.

At block 916, a bitstream including the encoded video and metadata is generated. For example, the bitstream may be transmitted to a decoder and renderer for generating a view to display on a display device.

This process flow diagram is not intended to indicate that the blocks of the example method 900 are to be executed in any particular order, or that all of the blocks are to be included in every case. Further, any number of additional blocks not shown may be included within the example method 900, depending on the details of the specific implementation.

Figure 10:
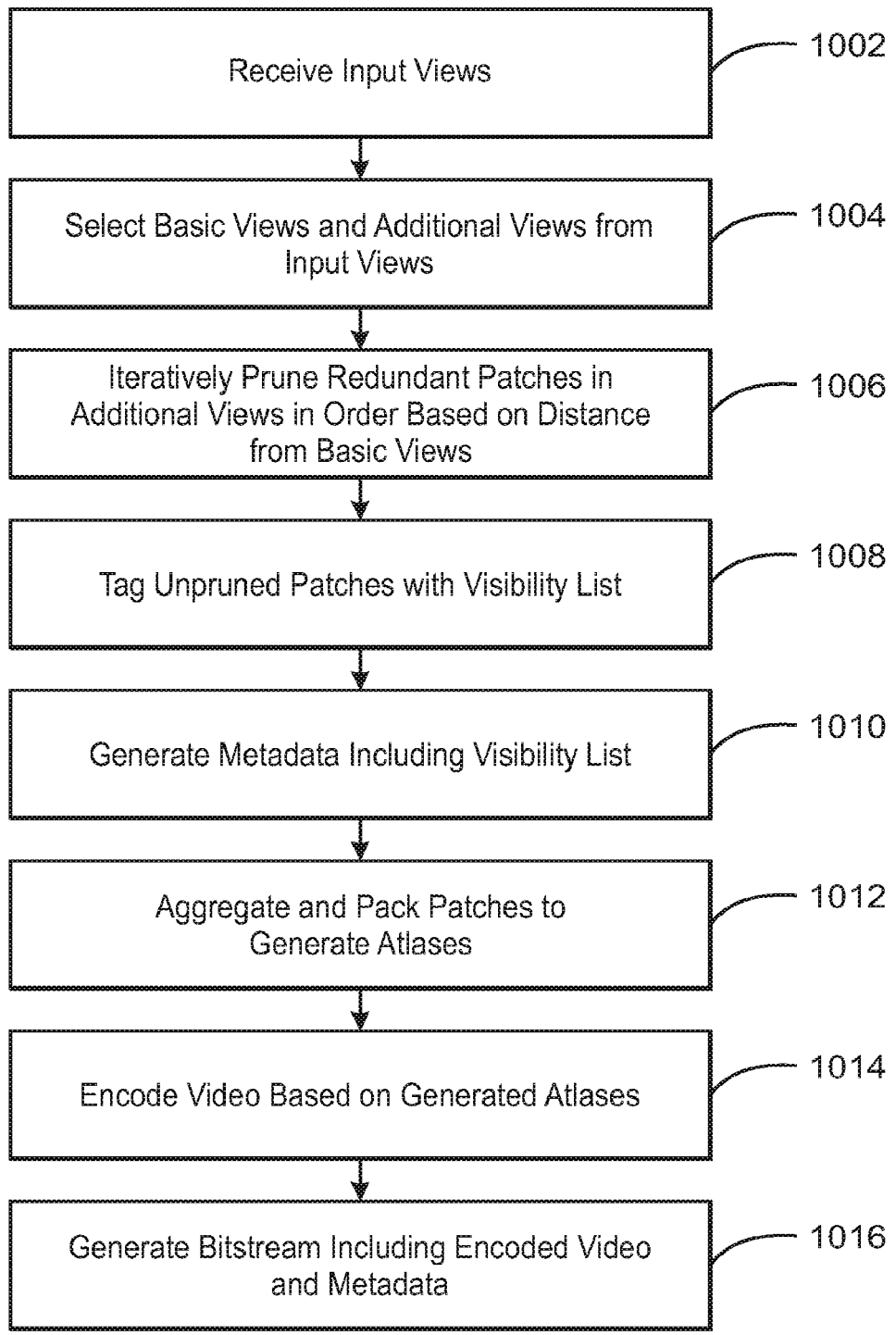
FIG. 10 is a flow chart illustrating a method for generating bitstreams using visibility lists.

FIG. 10 is a flow chart illustrating a method for generating bitstreams using visibility lists. The example method 1000 can be implemented in the system 100 of FIG. 1, the processor 1302 and immersive video encoder 1328 of the computing device 1300 of FIG. 13, or the computer readable media 1400 of FIG. 14.

At block 1002, input views are received. For example, the input views may be a set of source views from a source camera.

At block 1004, basic views and additional views are selected from the input views. For example, a number of basic views to be used may be determined based on direction deviation, field of view, and distance and overlap between views. Basic views may be selected based on the distance to a central view position and some overlap. In various examples, all other non-selected source views may be labeled as additional views and passed along with the basic views to the output of the view optimizer.

At block 1006, redundant patches are iteratively pruned from additional views in order based on distance from the basic views. For example, the additional views may be ordered such that the farthest view with respect to the basic views is pruned first. Then the second farthest view to the basic views and the previously pruned additional view is pruned next. In various examples, the process may repeat until all additional views outputted by the view optimizer are sorted and pruned.

At block 1008, unpruned patches are tagged with a visibility list. For example, the visibility list can be used to indicate if correspondent regions are available in other views.

At block 1010, metadata is generated including the visibility list. In various examples, the visibility list may be added per patch within the atlas patch parameters list that is included in the metadata.

At block 1012, patches are aggregated and packed to generate atlases. For example, the patches may be aggregated from a pruner over time.

At block 1014, a video is encoded based on the generated atlases. For example, the video may be encoded using any suitable codec, such as the HEVC codec.

At block 1016, a bitstream including the encoded video and metadata is generated. For example, the bitstream may be transmitted to a decoder and renderer for generating a view to display on a display device.

This process flow diagram is not intended to indicate that the blocks of the example method 1000 are to be executed in any particular order, or that all of the blocks are to be included in every case. Further, any number of additional blocks not shown may be included within the example method 1000, depending on the details of the specific implementation.

Figure 11:
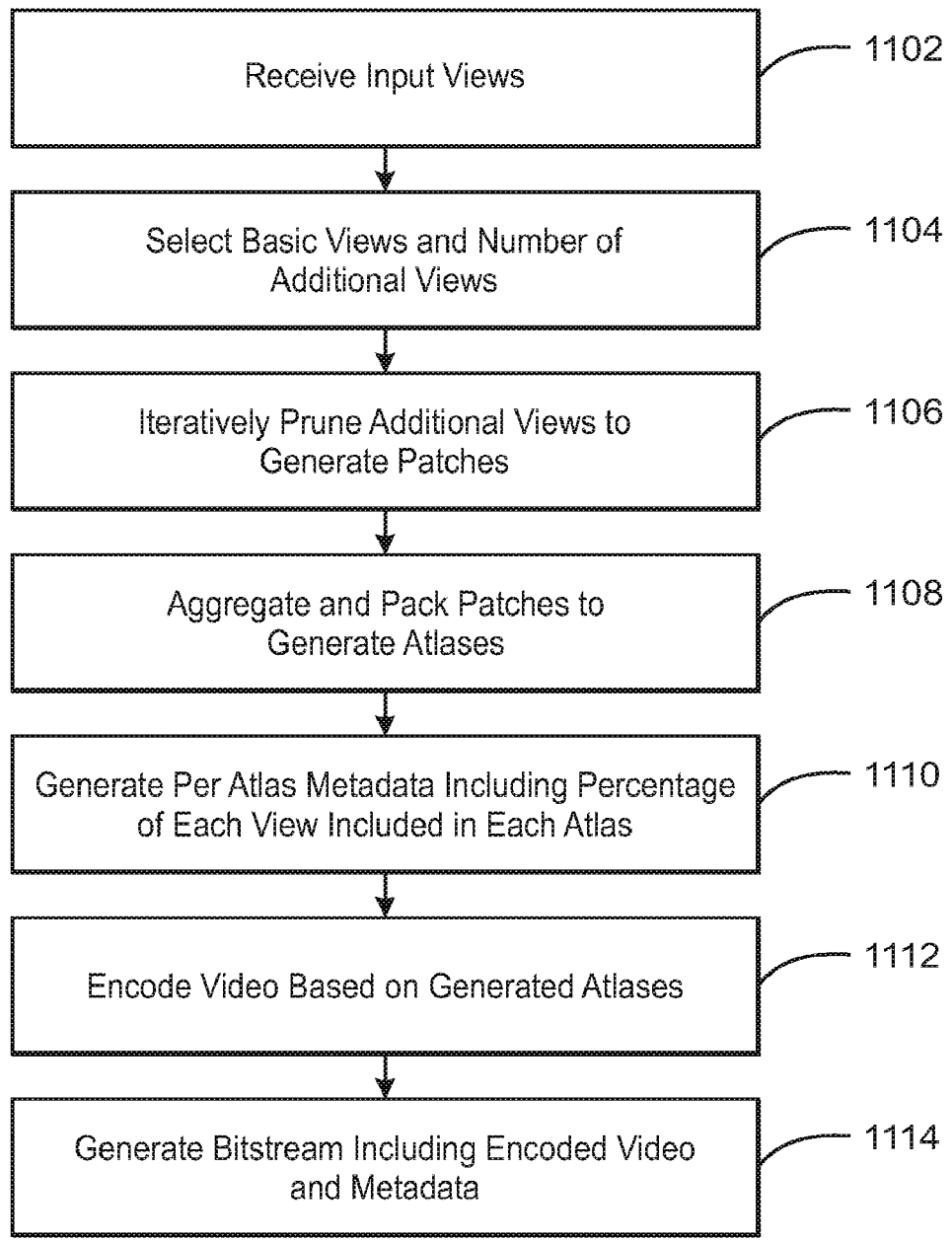
FIG. 11 is a flow chart illustrating a method for generating bitstreams using atlas metadata with view percentage.

FIG. 11 is a flow chart illustrating a method for generating bitstreams using atlas metadata with view percentage. The example method 1100 can be implemented in the system 100 of FIG. 1, the processor 1302 and immersive video encoder 1328 of the computing device 1300 of FIG. 13, or the computer readable media 1400 of FIG. 14.

At block 1102, input views are received. For example, the input views may be a set of source views from a source camera.

At block 1104, a number of basic views and a number of additional views are selected. For example, a number of basic views 120 to be used may be determined based on direction deviation, field of view, and distance and overlap between views. Basic views may be selected based on the distance to a central view position and some overlap. In various examples, all other non-selected source views may be labeled as additional views and passed along with the basic views to the output of the view optimizer.

At block 1106, additional views are iteratively pruned to generate patches. For example, the additional views may be pruned in the order that they are received. In some examples, the additional views may be reordered for pruning.

At block 1108, the patches are aggregated and packed to generate atlases. For example, the patches may be aggregated from a pruner over time.

At block 1110, per atlas metadata is generated including a percentage of each view included in each atlas. For example, each atlas may be tagged with what percentage of the samples of a particular view is included in the atlas. This information may be sent in a bitstream as per atlas metadata. Such mechanism using the views' percentage info per atlas can enable real-time performance which is critical for immersive applications.

At block 1112, a video is encoded based on the generated atlases. For example, the video may be encoded using any suitable codec, such as the HEVC codec.

At block 1114, a bitstream including the encoded video and metadata is generated. For example, the bitstream may be transmitted to a decoder and renderer for generating a view to display on a display device.

This process flow diagram is not intended to indicate that the blocks of the example method 1100 are to be executed in any particular order, or that all of the blocks are to be included in every case. Further, any number of additional blocks not shown may be included within the example method 1100, depending on the details of the specific implementation. In various examples, the method may include using this metadata to decide which atlases to access and in what order to such that a renderer reconstructs the desired viewport based on atlases that contain data for views that are closest to the pose of the desired synthesized viewport. The number of atlases that are decoded and rendered from can be reduced saving computational power and memory usage.

Figure 12:
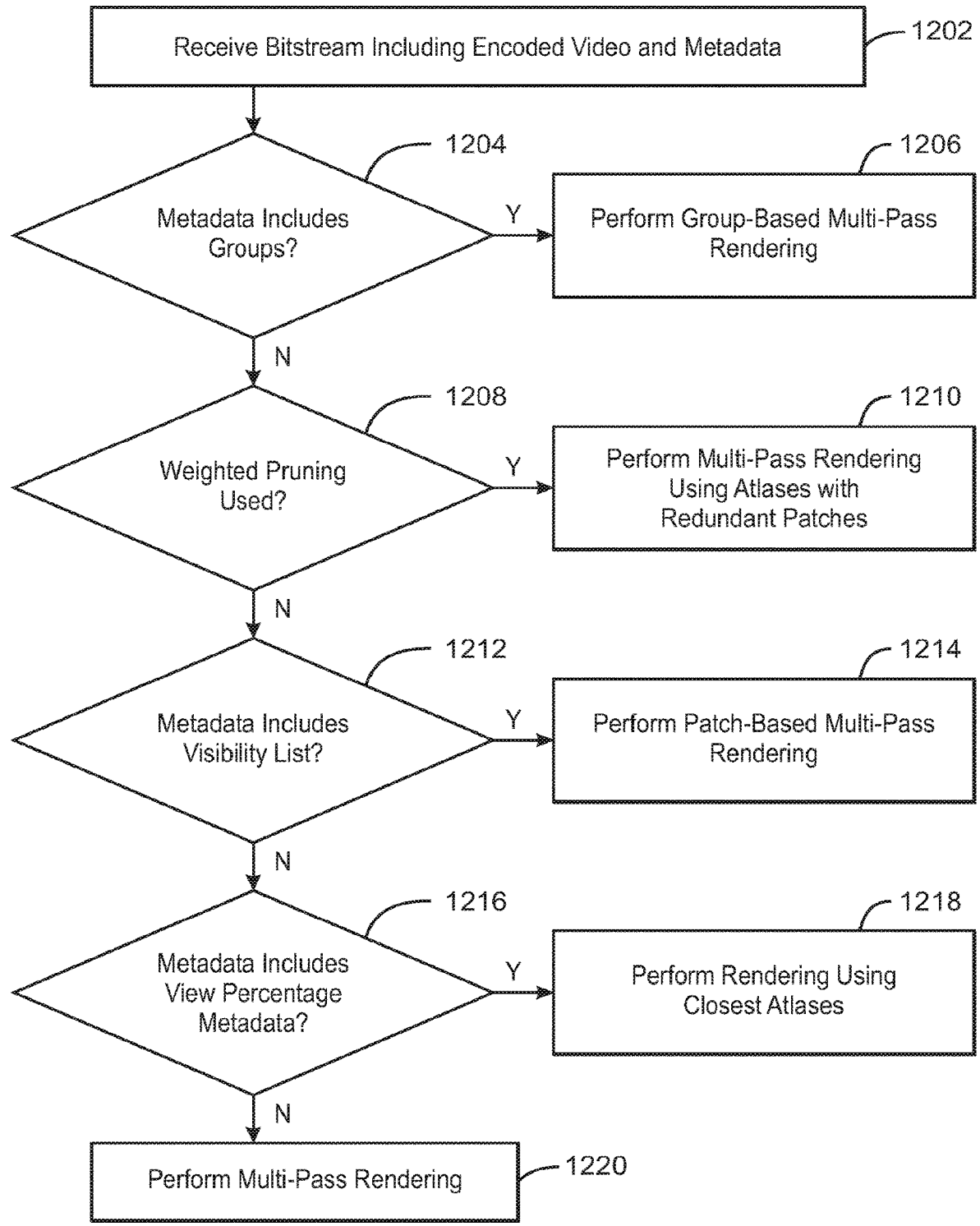
FIG. 12 is a flow chart illustrating a method for rendering views using bitstreams encoded according to techniques described herein.

FIG. 12 is a flow chart illustrating a method for rendering views using bitstreams encoded according to techniques described herein. The example method 1200 can be implemented in the system 200 of FIG. 2, the decoder 1342 of the computing device 1300 of FIG. 13, or the computer readable media 1300 of FIG. 13.

At block 1202, a bitstream including encoded video and metadata is received. The metadata may include various information. For example, the metadata may include a number of groups and which views being part of which encoded group. In some examples, the metadata may include a visibility list indicating a set of views in which each patch is visible.

At decision diamond 1204, a determination is made as to whether the metadata includes groups. If the metadata does not include groups, then the method may continue at decision diamond 1208. If the metadata does include groups, then the method may continue at block 1206.

At block 1206, a group-based multi pass rendering is performed. For example, the group-based multi pass rendering may be performed using the system 400 of FIG. 4.

At decision diamond 1208, a determination is made as to whether weight pruning was used to encode the bitstream. If the weight pruning was not used to encode the bitstream, then the method may continue at decision diamond 1212. If the metadata does include groups, then the method may continue at block 1210.

At block 1210, a multi-pass rendering using atlases with redundant patches may be performed. For example, the multi-pass rendering may be performed using the system 100 of FIG. 1.

At decision diamond 1212, a determination is made as to whether the metadata includes a visibility list. If the metadata does not include a visibility list, then the method may continue at decision diamond 1216. If the metadata does include a visibility list, then the method may continue at block 1214.

At block 1214, a patch-based multi-passed rendering may be performed. For example, the patch-based multi-passed rendering may be performed using the system 600 of FIG. 6.

At decision diamond 1216, a determination is made as to whether the metadata includes view percentage data. If the metadata does not include view percentage data, then the method may continue at block 1220. If the metadata does include view percentage data, then the method may continue at block 1218.

At block 1218, a multi-pass rendering is performed. For example, the multi-pass rendering may be performed using the system 100 of FIG. 1.

This process flow diagram is not intended to indicate that the blocks of the example method 1200 are to be executed in any particular order, or that all of the blocks are to be included in every case. Further, any number of additional blocks not shown may be included within the example method 1200, depending on the details of the specific implementation. In some examples, the metadata may include two or more of types of information in decision diamonds 1204, 1208, 1212, and 1216. Thus, two or more of the blocks 1206, 1210, 1214, and 1218 may be performed simultaneously.

Figure 13:
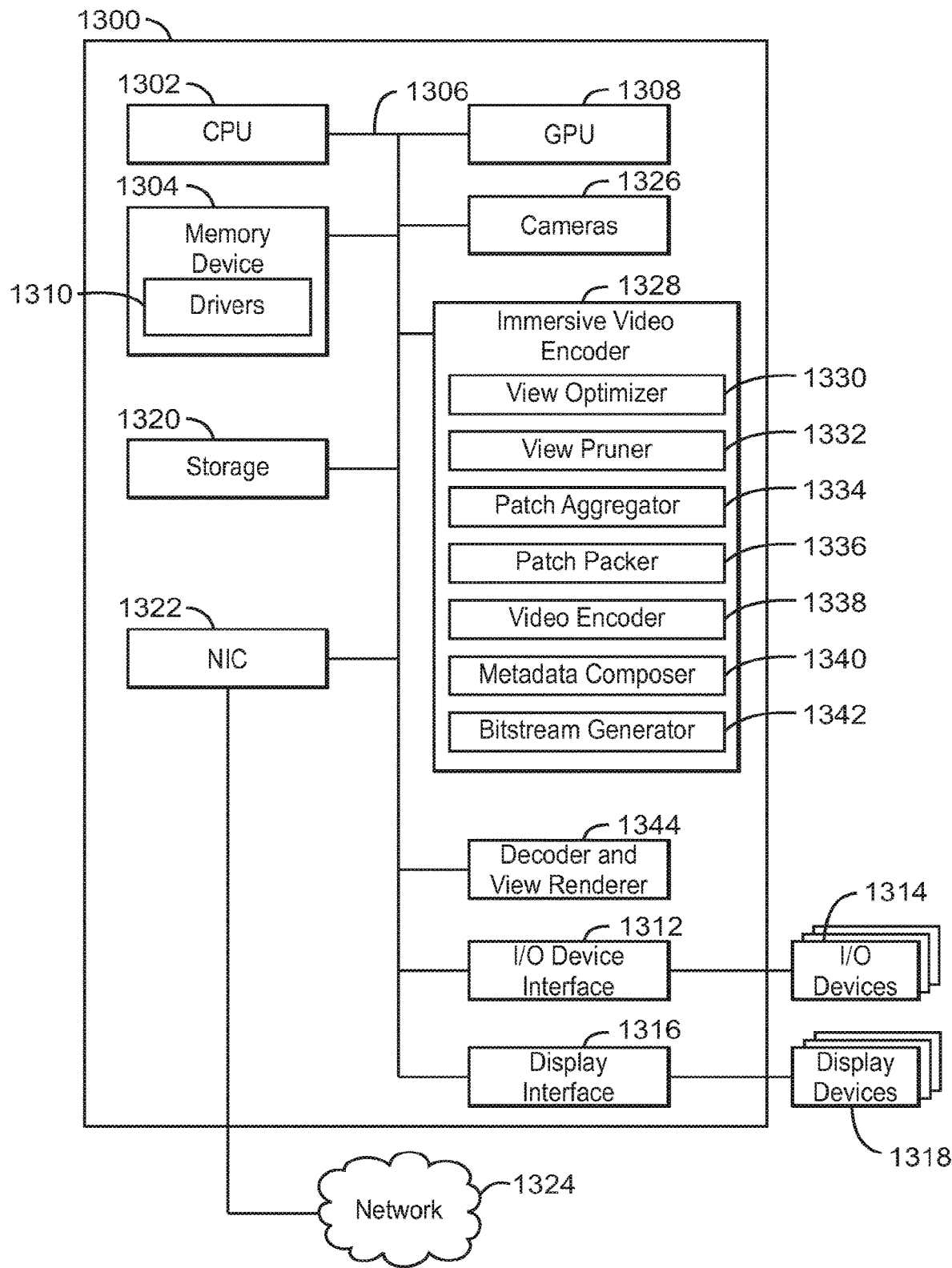
FIG. 13 is block diagram illustrating an example computing device that can encode and decode bitstreams according to techniques described herein.

Referring now to FIG. 13, a block diagram is shown illustrating an example computing device that can encode and decode bitstreams according to techniques described herein. The computing device 1300 may be, for example, a laptop computer, desktop computer, tablet computer, mobile device, or wearable device, among others. In some examples, the computing device 1300 may be an immersive video streaming device. The computing device 1300 may include a central processing unit (CPU) 1302 that is configured to execute stored instructions, as well as a memory device 1304 that stores instructions that are executable by the CPU 1302. The CPU 1302 may be coupled to the memory device 1304 by a bus 1306. Additionally, the CPU 1302 can be a single core processor, a multi-core processor, a computing cluster, or any number of other configurations. Furthermore, the computing device 1300 may include more than one CPU 1302. In some examples, the CPU 1302 may be a system-on-chip (SoC) with a multi-core processor architecture. In some examples, the CPU 1302 can be a specialized digital signal processor (DSP) used for image processing. The memory device 1304 can include random access memory (RAM), read only memory (ROM), flash memory, or any other suitable memory systems. For example, the memory device 1304 may include dynamic random access memory (DRAM).

The memory device 1304 can include random access memory (RAM), read only memory (ROM), flash memory, or any other suitable memory systems. For example, the memory device 1304 may include dynamic random access memory (DRAM).

The computing device 1300 may also include a graphics processing unit (GPU) 1308. As shown, the CPU 1302 may be coupled through the bus 1306 to the GPU 1308. The GPU 1308 may be configured to perform any number of graphics operations within the computing device 1300. For example, the GPU 1308 may be configured to render or manipulate graphics images, graphics frames, videos, or the like, to be displayed to a user of the computing device 1300.

The memory device 1304 can include random access memory (RAM), read only memory (ROM), flash memory, or any other suitable memory systems. For example, the memory device 1304 may include dynamic random access memory (DRAM). The memory device 1304 may include device drivers 1310 that are configured to execute the instructions for generating bitstreams. The device drivers 1310 may be software, an application program, application code, or the like.

The CPU 1302 may also be connected through the bus 1306 to an input/output (I/O) device interface 1312 configured to connect the computing device 1300 to one or more I/O devices 1314. The I/O devices 1314 may include, for example, a keyboard and a pointing device, wherein the pointing device may include a touchpad or a touchscreen, among others. The I/O devices 1314 may be built-in components of the computing device 1300, or may be devices that are externally connected to the computing device 1300. In some examples, the memory 1304 may be communicatively coupled to I/O devices 1314 through direct memory access (DMA).

The CPU 1302 may also be linked through the bus 1306 to a display interface 1316 configured to connect the computing device 1300 to a display device 1318. The display device 1318 may include a display screen that is a built-in component of the computing device 1300. The display device 1318 may also include a computer monitor, television, or projector, among others, that is internal to or externally connected to the computing device 1300.

The computing device 1300 also includes a storage device 1320. The storage device 1320 is a physical memory such as a hard drive, an optical drive, a thumbdrive, an array of drives, a solid-state drive, or any combinations thereof. The storage device 1320 may also include remote storage drives.

The computing device 1300 may also include a network interface controller (NIC) 1322. The NIC 1322 may be configured to connect the computing device 1300 through the bus 1306 to a network 1324. The network 1324 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 1300 further includes cameras 1326. For example, the cameras may include one or more depth sensors. In some examples, the cameras may include a processor to generate depth information from two or more images. In some examples, the cameras may include one or more light sensors to capture light through one or more color filters. In some examples, the camera 1326 may thus generate texture images, such as color images in any suitable color space.

The computing device 1300 further includes an immersive video encoder 1328. For example, the immersive video encoder 1328 can be used to generate a bitstream to be used by a decoder for generating a view in a display device. The immersive video encoder 1328 can include a view optimizer 1330, a view pruner 1332, a patch aggregator 1334, a patch packer 1336, a video encoder 1338, a metadata composer 1340, and a bitstream generator 1342. In some examples, each of the components 1330-1342 of the immersive video encoder 1328 may be a microcontroller, embedded processor, or software module. The view optimizer 1330 can receive input views and select basic views and additional views from the input views. In some examples, the view optimizer 1330 selects a number of basic views to be used may be determined based on direction deviation, field of view, and distance and overlap between views. In some examples, the view optimizer 1330 selects the basic views based on the distance to a central view position and an overlap. In various examples, all other non-selected source views may be labeled as additional views and passed along with the basic views to the output of the view optimizer. In various examples, the view optimizer 1330 can group the views into a plurality of groups. Each group includes a basic view and a set of neighboring additional views. In some examples, the view optimizer 1330 can order the additional views by distance from the basic views. The view pruner 1332 can prune the additional views based on a comparison with the basic views. In various examples, the view pruner 1332 can prune additional views in each of the groups in parallel. In some examples, the view pruner 1332 can prune additional views using weight maps. For example, the view pruner 1332 can avoid pruning a patch from an additional view based on a value in a weight map exceeding a threshold value. The patch aggregator 1334 can aggregate patches from the pruner over time. The patch packer 1336 can generate atlases based on the pruned additional views and the basic views. The metadata composer 1340 can generate metadata including additional metadata. In some examples, the additional metadata includes a number of groups used to prune the additional views. In various examples, the additional metadata includes a list of views that correspond to each of the groups. In some examples, the additional metadata includes a visibility list. In various examples, the additional metadata includes a view percentage metadata. The bitstream generator 1342 can generate a bitstream including the encoded video and the metadata.

The computing device 1300 also further includes a decoder and view renderer 1344 to receive bitstreams and a viewing position and orientation and generate views based on viewing position and orientation. For example, the decoder and view renderer 1344 may be the system 200 of FIG. 2. In some examples, the decoder and view renderer 1344 can receive a bitstream including encoded video and metadata including additional metadata. The decoder and view renderer 1344 can extract the additional metadata from the metadata. The decoder and view renderer 1344 can also render a view based on the extracted additional metadata. In various examples, the additional metadata includes a number of groups used to prune the additional views. In some examples, the additional metadata includes a list of views that correspond to each of the groups. In various examples, the additional metadata includes a visibility list per patch. In some examples, the additional metadata includes a visibility list per patch.

The block diagram of FIG. 13 is not intended to indicate that the computing device 1300 is to include all of the components shown in FIG. 13. Rather, the computing device 1300 can include fewer or additional components not illustrated in FIG. 13, such as additional buffers, additional processors, and the like. The computing device 1300 may include any number of additional components not shown in FIG. 13, depending on the details of the specific implementation. Furthermore, any of the functionalities of the view optimizer 1330, the view pruner 1332, the patch aggregator 1334, the patch packer 1336, the video encoder 1338, the metadata composer 1340, and the bitstream generator 1342, may be partially, or entirely, implemented in hardware and/or in the processor 1302. For example, the functionality may be implemented with an application specific integrated circuit, in logic implemented in the processor 1302, or in any other device. In addition, any of the functionalities of the CPU 1302 may be partially, or entirely, implemented in hardware and/or in a processor. For example, the functionality of the immersive video encoder 1328 may be implemented with an application specific integrated circuit, in logic implemented in a processor, in logic implemented in a specialized graphics processing unit such as the GPU 1308, or in any other device.

Figure 14:
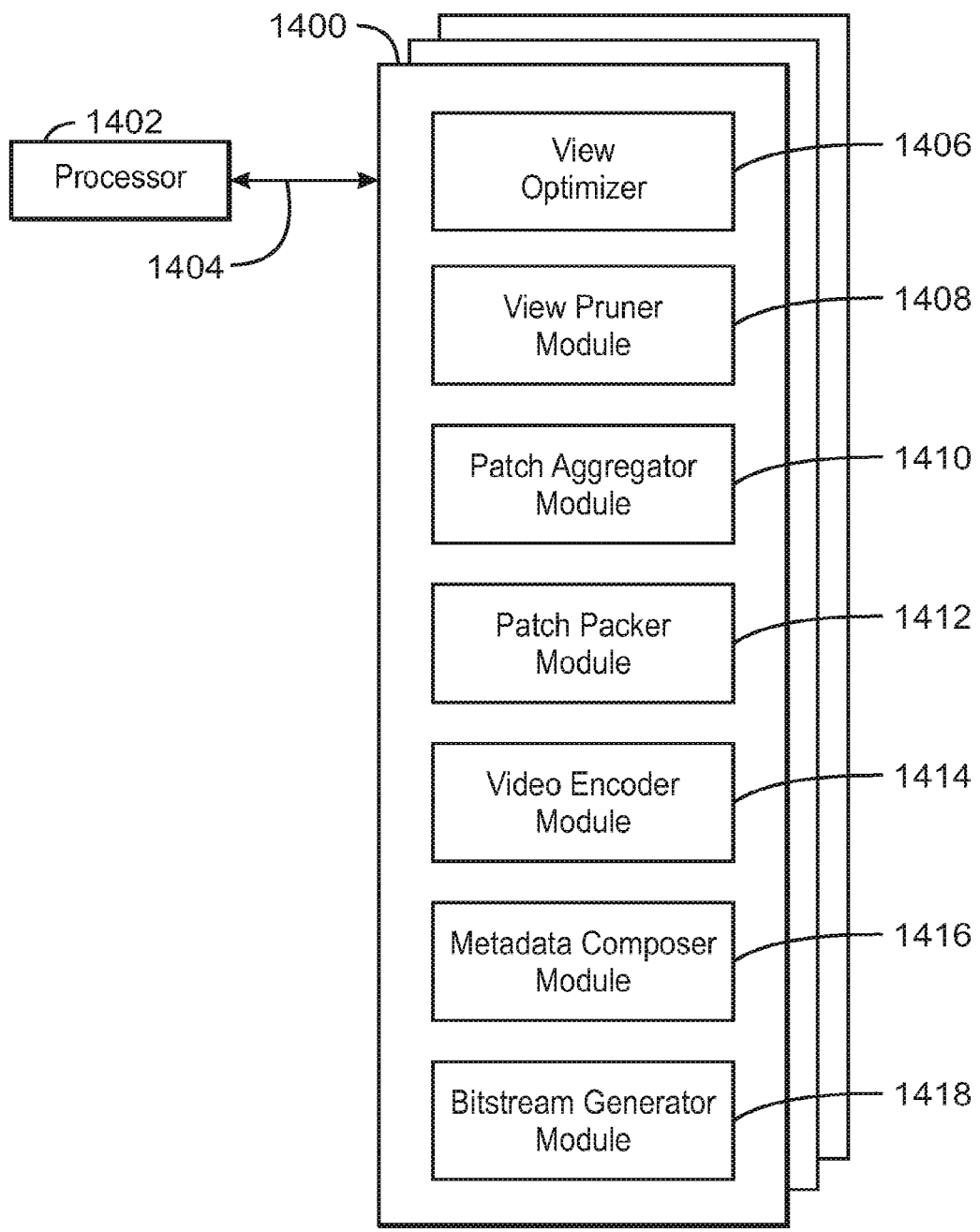
FIG. 14 is a block diagram showing computer readable media that store code for encoding and decoding bitstreams according to techniques described herein.

FIG. 14 is a block diagram showing computer readable media 1400 that store code for encoding and decoding bitstreams according to techniques described herein. The computer readable media 1400 may be accessed by a processor 1402 over a computer bus 1404. Furthermore, the computer readable medium 1400 may include code configured to direct the processor 1402 to perform the methods described herein. In some embodiments, the computer readable media 1400 may be non-transitory computer readable media. In some examples, the computer readable media 1400 may be storage media.

The various software components discussed herein may be stored on one or more computer readable media 1400, as indicated in FIG. 14. For example, a view optimizer module 1406 may be configured to receive a plurality of input views from a source camera and select basic views and additional views from the plurality of input views. In some examples, the view optimizer module 1406 may be configured to group the views into a plurality of groups, wherein each group includes a basic view and a set of neighboring additional views. In various examples, the view optimizer module 1406 may be configured to order the additional views by distance from the basic views. A view pruner module 1408 may be configured to prune the additional views based on a comparison with the basic views. In some examples, the view pruner module 1408 may be configured to prune additional views in each of the groups in parallel. In various examples, the view pruner module 1408 may be configured to the prune additional views using weight maps. For example, the view pruner module 1408 may be configured to avoid pruning a patch from an additional view based on a value in a weight map exceeding a threshold value. A patch aggregator module 1410 may be configured to aggregate patches from the pruner over time. A patch packer module 1412 may be configured to generate atlases based on the pruned additional views and the basic views. A metadata computer module 1416 may be configured to generate metadata including additional metadata. For example, the additional metadata may include a number of groups used to prune the additional views. In some examples, the additional metadata includes a list of views that correspond to each of the groups. In some examples, the additional metadata includes the additional metadata includes a visibility list. In various examples, the additional metadata includes a view percentage metadata. A bitstream generator module 1418 may be configured to generate a bitstream including the encoded video and the metadata.

The block diagram of FIG. 14 is not intended to indicate that the computer readable media 1400 is to include all of the components shown in FIG. 14. Further, the computer readable media 1400 may include any number of additional components not shown in FIG. 14, depending on the details of the specific implementation.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for encoding immersive video, the apparatus comprising:
   interface circuitry;
   machine readable instructions; and
   at least one processor circuit to be programmed by the machine readable instructions to:
   select first views from a plurality of input views, the plurality of input views from a plurality of source cameras, ones of the input views that are not selected to be second views;
   filter information from second views based on comparisons with the first views to obtain pruned additional views;
   generate atlases based on the pruned additional views and the first views;
   generate metadata associated with the pruned additional views; and
   generate a bitstream including encoded video and the metadata, the encoded video based on the generated atlases.

2. The apparatus of claim 1, wherein one or more of the at least one processor circuit is to arrange the plurality of input views into a plurality of groups, respective ones of the groups including a respective one of the first views and a respective set of neighboring ones of the second views.

3. The apparatus of claim 2, wherein the metadata includes a number of groups used to obtain the pruned additional views.

4. The apparatus of claim 3, wherein the metadata identifies the respective one of the first views that corresponds to the respective ones of the groups.

5. The apparatus of claim 2, wherein one or more of the at least one processor circuit is to prune the respective set of neighboring ones of the second views of different ones of the groups in parallel.

6. The apparatus of claim 1, wherein the information filtered from the second views include patches, and the metadata includes a visibility list per patch.

7. The apparatus of claim 1, wherein the metadata includes a view percentage metadata per atlas, the view percentage metadata representing a percentage of samples of a particular view that are included in an atlas.

8. The apparatus of claim 1, wherein one or more of the at least one processor circuit is to order the second views by an amount of distance and an amount of overlap between fields of view of respective ones of the second views and respective ones of the first views.

9. The apparatus of claim 1, wherein one or more of the at least one processor circuit is to prune the second views based on weight maps.

10. The apparatus of claim 9, wherein one or more of the at least one processor circuit is to update the weight maps based on previously pruned additional views.

11. The apparatus of claim 1, wherein one or more of the at least one processor circuit is to avoid pruning a patch from a first one of the second views based on a value in a weight map exceeding a threshold value.

12. An apparatus comprising:
at least one memory;
machine readable instructions; and
at least one processor circuit to be programmed by the machine readable instructions to:
form at least two groups of views from a plurality of input views, respective ones of the at least two groups of views including respective subsets of neighboring input views, the plurality of input views from a plurality of source cameras, the respective ones of the at least two groups of views independent of other ones of the at least two group of views, the respective ones of the at least two groups of views including at least one respective basic view and a respective number of additional views;
prune ones of the additional views in a first one of the at least two groups of views based on first comparisons with other ones of the additional views in the first one of the at least two groups of views, the ones of the additional views to be pruned to (i) remove information that is redundant based on the first comparisons, and (ii) retain information that is not redundant based on the first comparisons, the information that is not redundant corresponding to respective patches for the first one of the at least two groups of views;
prune ones of the patches based on second comparisons of the ones of the patches with a corresponding one of a plurality of base views included in the first one of the at least two groups of views; and
encode the at least two groups of views in parallel.

13. The apparatus of claim 12, wherein one or more of the at least one processor circuit is to aggregate and pack the patches to generate atlases, wherein ones of the atlases include respective numbers of patches.

14. A non-transitory machine readable storage comprising instructions to cause at least one processor circuit to at least:
form at least two groups of views from a plurality of input views, respective ones of the at least two groups of views including respective subsets of neighboring input views, the plurality of input views from a plurality of source cameras, the respective ones of the at least two groups of views independent of other ones of the at least two group of views, the respective ones of the at least two groups of views including at least one respective basic view and a respective number of additional views;
prune ones of the additional views in a first one of the at least two groups of views, the pruning of the additional views based on first comparisons with other ones of the additional views in the first one of the at least two groups of views, the ones of additional views to be pruned to (i) remove information that is redundant based on the first comparisons, and (ii) retain information that is not redundant based on the first comparisons, the information that is not redundant corresponding to respective patches for the first one of the at least two groups of views;
prune ones of the patches based on second comparisons of the ones of the patches with a corresponding one of a plurality of base views included in the first one of the at least two groups of views; and
encode the at least two groups of views in parallel.

15. The non-transitory machine readable storage of claim 14, wherein the instructions are to cause one or more of the at least one processor circuit to aggregate and pack the patches to generate atlases, wherein ones of the atlases include respective numbers of patches.

16. The non-transitory machine readable storage of claim 14, wherein the instructions are to cause one or more of the at least one processor circuit to generate metadata for the at least two groups of views, the metadata to include a number of groups of views and information identifying the views included in the respective ones of the at least two groups.

* * * * *